(12) United States Patent
Lee et al.

(10) Patent No.: US 10,149,095 B2
(45) Date of Patent: Dec. 4, 2018

(54) METHOD AND APPARATUS FOR PROVIDING LOCATION INFORMATION

(71) Applicant: Samsung Electronics Co., Ltd., Suwon-si, Gyeonggi-do (KR)

(72) Inventors: Chae-Heun Lee, Suwon-si (KR); Bo-Sung Kwak, Suwon-si (KR); Myeong-Woo Koo, Suwon-si (KR); Tae-Ho Kim, Cheongju-si (KR); Jeong-Min Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 15/217,104

(22) Filed: Jul. 22, 2016

(65) Prior Publication Data

US 2017/0048668 A1 Feb. 16, 2017

(30) Foreign Application Priority Data

Aug. 12, 2015 (KR) .......................... 10-2015-0114116

(51) Int. Cl.
*H04W 24/00* (2009.01)
*H04W 4/021* (2018.01)
*H04W 4/02* (2018.01)
*H04W 52/02* (2009.01)
*H04W 4/70* (2018.01)

(52) U.S. Cl.
CPC ........... *H04W 4/021* (2013.01); *H04W 4/025* (2013.01); *H04W 4/70* (2018.02); *H04W 52/0254* (2013.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/168* (2018.01); *Y02D 70/26* (2018.01)

(58) Field of Classification Search
CPC ....... H04W 4/02; H04W 64/00; H04W 52/02; H04W 52/0229; H04W 52/0225; H04W 52/028; H04W 52/24; H04W 52/50; H04W 52/367; H04W 52/12; H04W 52/40
USPC ......................... 455/456.1, 456.2, 456.3, 574
See application file for complete search history.

(56) References Cited

U.S. PATENT DOCUMENTS

2012/0194382 A1 8/2012 Anderson et al.
2012/0309409 A1 12/2012 Grosman et al.
(Continued)

FOREIGN PATENT DOCUMENTS

KR 10-2012-0081304 A 7/2012
WO 2013/056145 A1 4/2013

*Primary Examiner* — Temica M Beamer
(74) *Attorney, Agent, or Firm* — Jefferson IP Law, LLP

(57) ABSTRACT

A method of an electronic device and the electronic device including a first processor operable at a first power level and a second processor operable at a second power level are provided. The method includes receiving first location information of the electronic device from an external electronic device through at least one first sensor functionally connected with the first processor, and upon failure to identify second location information of the electronic device from the external electronic device through the at least one first sensor using the first processor, obtaining the second location information through at least one second sensor functionally connected with the second processor using the second processor.

21 Claims, 15 Drawing Sheets

(56) References Cited

U.S. PATENT DOCUMENTS

| | | | |
|---|---|---|---|
| 2012/0329480 A1* | 12/2012 | Hashimoto | G01S 19/34 455/456.1 |
| 2013/0169475 A1* | 7/2013 | Lanes | G01S 19/40 342/357.23 |
| 2013/0238921 A1 | 9/2013 | Alpert et al. | |
| 2013/0244686 A1 | 9/2013 | Saha et al. | |
| 2013/0295955 A1 | 11/2013 | Sheshadri et al. | |
| 2013/0324196 A1 | 12/2013 | Wang et al. | |
| 2015/0099546 A1 | 4/2015 | Heo et al. | |
| 2015/0176998 A1 | 6/2015 | Huang et al. | |
| 2015/0279187 A1* | 10/2015 | Kranz | G08B 21/0415 340/539.12 |
| 2017/0188307 A1* | 6/2017 | Huang | H04W 52/0251 |

\* cited by examiner

METHOD AND APPARATUS FOR PROVIDING LOCATION INFORMATION

CROSS-REFERENCE TO RELATED APPLICATION(S)

This application claims the benefit under 35 U.S.C. § 119(a) of a Korean patent application filed on Aug. 12, 2015 in the Korean Intellectual Property Office and assigned Serial number 10-2015-0114116, the entire disclosure of which is hereby incorporated by reference.

TECHNICAL FIELD

The present disclosure relates to methods and apparatuses for providing location information.

BACKGROUND

More interest is nowadays attracted to services based on geo-fence, which corresponds to a virtual border for a particular region or a geographical location.

A geo-fence may be created whenever necessary, such as in a space within a radius of 100 m from a particular store, or a predefined area, such as an administrative district or school zone around an elementary school, and may play a role as a geo-fence.

Recent electronic devices are being developed to be carried by individuals, and as location-based services may be able to provide location-based services anytime and anywhere using signals from the global positioning system (GPS) or base stations, a user may receive geo-fence-based services through an electronic device.

An electronic device may be driven using a compact and low-capable battery, and as its high-performance processor continues to obtain and process location information to provide services requiring the acquisition of location information, such as geo-fence services, the electronic device may quickly consume power.

Generally, location information may be obtained using a GPS module alone or using both a GPS module and a network location information providing module. The use of a GPS module alone cannot provide location information in a shadow zone and increases power consumption because attempts to obtain location information through the GPS module frequently occurs even in the shadow zone to quickly recognize the escape from the shadow zone.

The use of both a GPS module and a network location information providing module is not free from the issue that the network location information providing module itself cannot determine whether the electronic device is located in an open zone or shadow zone. For such reasons, when the electronic device is in a shadow zone, the network location information providing module obtains location information while the GPS module also attempts to obtain location information in order to notice the escape from the shadow zone, resulting in a significantly increased power consumption.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and apparatuses for obtaining location information, which enable an electronic device to control the acquisition of location information through a low-power processor, thus minimizing the wakeup of the high-power processor and enabling location information to be acquired without influence regardless of whether the electronic device is located in the open or shadow zone to thereby eliminate the need of determining the escape of the shadow zone. Thus, power consumption to obtain location information may be minimized.

In accordance with an aspect of the present disclosure, a method for obtaining location information by an electronic device including a first processor operable at a first power level and a second processor operable at a second power level is provided. The method includes receiving first location information of the electronic device from an external electronic device through at least one first sensor functionally connected with the first processor, and upon failure to identify second location information of the electronic device from the external electronic device through the at least one first sensor using the first processor, obtaining the second location information through at least one second sensor functionally connected with the second processor using the second processor.

In accordance with another aspect of the present disclosure, an electronic device is provided. The electronic device includes a memory configured to store location information of the electronic device received from an external electronic device, a first processor operable at a first power level, and a second processor operable at a second power level. The first processor is configured to receive first location information of the electronic device from the external electronic device through at least one first sensor functionally connected with the first processor, and upon failure to identify second location information of the electronic device from the external electronic device through the at least one first sensor, transmit a notification corresponding to the failure to the second processor.

In accordance with another aspect of the present disclosure, a non-transitory computer-readable storage medium, which stores a program and commands configured to be executed by at least one processor to enable the at least one processor to perform at least one operation in an electronic device including a first processor operable at a first power level and a second processor operable at a second power level, is provided. The at least one operation includes receiving first location information of the electronic device from an external electronic device through at least one first sensor functionally connected with the first processor, and upon failure to identify second location information of the electronic device from the external electronic device through the at least one first sensor using the first processor, obtaining the second location information through at least one second sensor functionally connected with the second processor using the second processor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
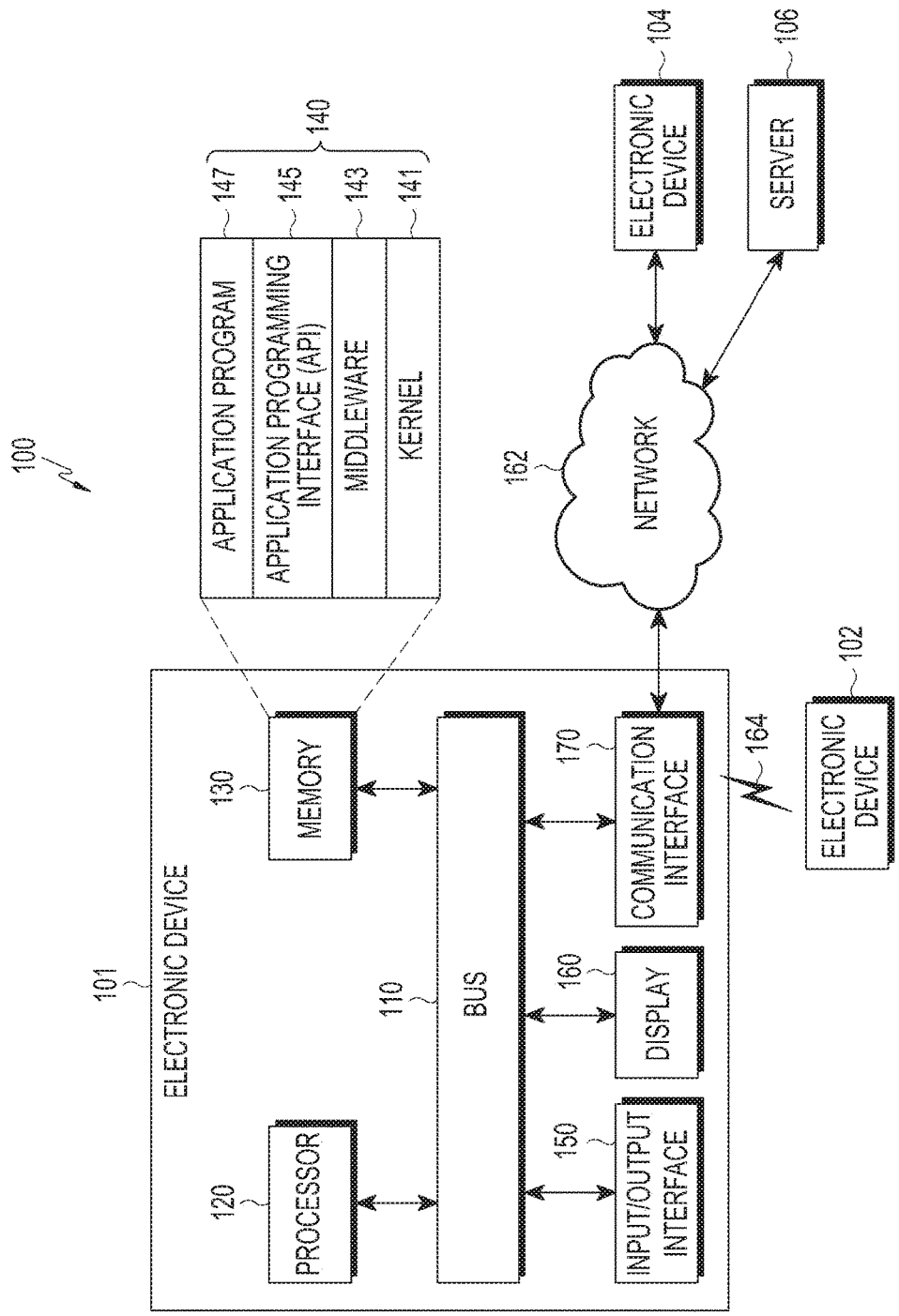
FIG. 1 is a block diagram illustrating an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HDM), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. For example, examples of the home appliance may include at least one of a television (TV), a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung Home-Sync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (e.g., a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automatic teller's machines (ATMs), point of sales (POS) devices, or Internet of Things (IoT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a block diagram illustrating an electronic device 101 in a network environment 100 according to an embodiment of the present disclosure.

Referring to FIG. 1, the electronic device 101 may include a bus 110, a processor 120, a memory 130, an input/output interface 150, a display 160, and a communication interface 170. In some embodiments of the present disclosure, the electronic device 101 may exclude at least one of the components or may add another component.

The bus 110 may include a circuit for connecting the components with one another and transferring communications (e.g., control messages and/or data) between the components.

The processor 120 may include one or more of a CPU, an AP, and a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program 147 (or "application"). At least a portion of the kernel 141, middleware 143, or API 145 may be denoted an operating system (OS).

For example, the kernel 141 may control or manage system resources (e.g., the bus 110, processor 120, or memory 130) used to perform operations or functions implemented in other programs (e.g., the middleware 143, API 145, or application 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application 147 in order of priority. For example, the middleware 143 may assign at least one application 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application 147.

The API 145 may be an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic LED (OLED) display, a microelectromechanical systems (MEMS) display, or an electronic paper display. The display 160 may display, e.g., various contents (e.g., one or more of text, images, videos, icons, and symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first external electronic device 102, a second external electronic device 104, or a server 106). For example, the communication interface 170 may be connected with the network 162 through wireless or wired communication to communicate with the external electronic device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBrox), or global system for mobile communications (GSM). Further, the wireless communication may include, e.g., short-range communication 164. The short-range communication 164 may include at least one of Wi-Fi, Bluetooth (BT), near-field communication (NFC), or GNSS. The GNSS may include at least one of, e.g., global positioning system (GPS), global orbiting navigation satellite system (GLONASS), Beidou navigation satellite system (hereinafter, "Beidou") and Galileo, or the European global satellite-based navigation system. Hereinafter, the terms "GPS" and "GNSS" may be interchangeably used herein. The wired connection may include at least one of universal serial bus (USB), high definition multimedia interface (HDMI), recommended standard 232 (RS-232), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the external electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., external electronic devices 102 and 104 or server 106) to perform at least some functions associated therewith. The other electronic device (e.g., external electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

According to an embodiment of the present disclosure, the processor 120 may include an AP as a main processor, which is a high-power processor that includes a high-performance CPU performing user interfaces (UIs) and complicated computations and a high-capability memory, and a supplementary processor (SP), which may be a low-power processor having a low-performance CPU and a low-capability memory as compared with the AP. According to an embodiment of the present disclosure, a first processor may include the SP, a sub processor, or a low-power processor, and a second processor may include the AP, a main processor, or a high-power processor. The AP may process at least part of information obtained from other elements (e.g., at least one of the SP, the memory 130, the input/output interface 150, or the communication interface 170) and may use the same in various manners. For example, the AP may control at least some functions of the electronic device 101 so that the electronic device 101 may interwork with another electronic device (e.g., the external electronic device 102 or 104 or the server 106). The AP may be integrated with the processor 120 or the communication interface 170. According to an embodiment of the present disclosure, at least one configuration of the AP may be included in the server 106 and may be supported for at least one operation implemented on the AP from the server 106. Here, the AP may have the same configuration as the processor 120, and the AP may be denoted as a "main processor," "central processing apparatus," "CPU," "high-power processor," "high-specification processor," or "AP."

The SP may be included in the processor 120 and may be a processor provided separately from the AP and optimized for low-power operations, and the SP may have a lower computational capability and further restricted interfaces and memories as compared with the AP to enable continuous operation with relatively minimized power consumption. The SP may interwork with, e.g., at least one sensor (e.g., an acceleration sensor, gyro sensor, or geo-magnetic sensor) to collect sensing data and may use the collected sensing data to produce context data representing the user's motion state (e.g., sitting, standing, walking, running, biking, or driving), a moving speed or a moving direction. Further, the SP may interwork with at least one communication module (e.g., a Wi-Fi module, a BT module, a GNSS module, or an NFC module) to obtain location information or discover short-range wireless signals. Here, the SP may also be denoted as a "sub processor," "sensor hub," "communication module," "GPS module," "micro controller," "sensing processor," or "SP."

Figure 2:
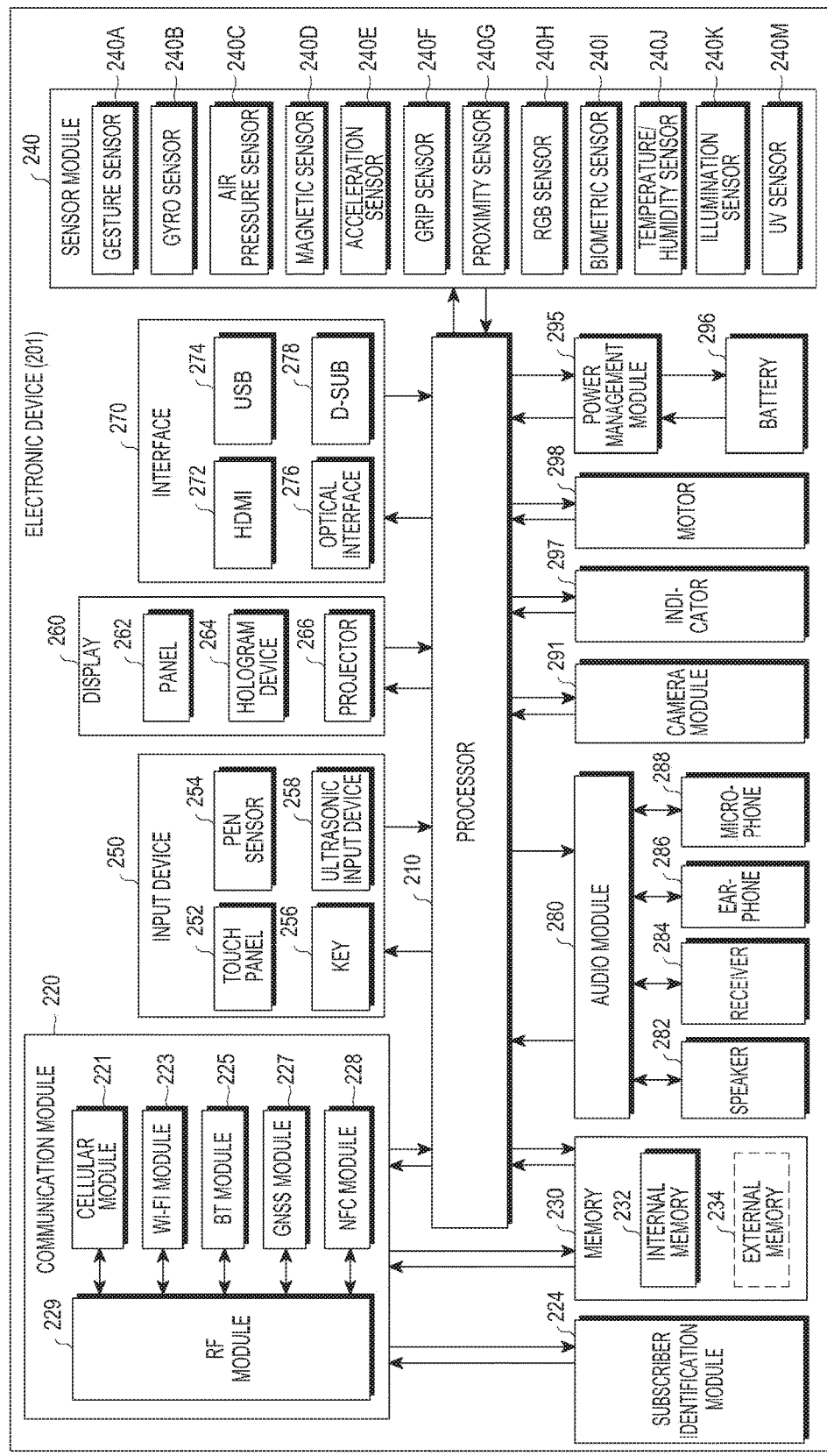
FIG. 2 is a block diagram illustrating an electronic device according to an embodiment of the present disclosure.

FIG. 2 is a block diagram illustrating an electronic device according to an embodiment of the present disclosure.

The electronic device 201 may include the whole or part of the configuration of, e.g., the electronic device 101 shown in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an OS or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor (ISP). The processor 210 may include at least some (e.g., cellular module 221) of the components shown in FIG. 2. The processor 210 may load a command or data received from at least one of other components (e.g., a non-volatile memory) on a volatile memory, process the command or data, and store various data in the non-volatile memory.

Referring to FIG. 2, the communication module 220 may have the same or similar configuration to the communication interface 170 of FIG. 1. The communication module 220 may include, e.g., cellular module 221, a Wi-Fi module 223, a BT module 225, a GNSS module 227, a NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using a SIM 224 (e.g., the SIM card). According to an embodiment of the present disclosure, the cellular module 221 may perform at least some of the functions provided by the processor 210. According to an embodiment of the present disclosure, the cellular module 221 may include a CP.

The Wi-Fi module 223, the BT module 225, the GNSS module 227, or the NFC module 228 may include a process for, e.g., processing data communicated through the module. At least some (e.g., two or more) of the cellular module 221, the Wi-Fi module 223, the BT module 225, the GNSS module 227, and the NFC module 228 may be included in a single integrated circuit (IC) or an IC package.

The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the BT module 225, the GNSS module 227, and the NFC module 228 may communicate RF signals through a separate RF module.

The SIM 224 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous DRAM (SDRAM), etc.) and a non-volatile memory (e.g., a one-time programmable read-only memory (OTPROM), a PROM, an erasable and programmable ROM (EPROM), an electrically EPROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a mini-SD memory, an extreme digital (xD) memory, or a memory stick. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., a red-green-blue (RGB) sensor, a biometric sensor 240I, a temperature/humidity sensor 240J, an illumination sensor 240K, and an ultra violet (UV) sensor 240M. Additionally or alternatively, the sensing module 240 may include, e.g., one of an E-nose sensor, an electromyography (EMG) sensor, an electroencephalogram (EEG) sensor, an electrocardiogram (ECG) sensor, an infrared (IR) sensor, an iris sensor, and a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of an AP 210 or separately from the AP 210, and the electronic device 931 may control the sensor module 240 while the AP is in a sleep mode.

The input device 250 may include, e.g., at least one of a touch panel 252, a (digital) pen sensor 254, a key 256, and an ultrasonic input device 258. The touch panel 252 may use at least one of capacitive, resistive, infrared, and ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., one of a physical button, an optical key, and a key pad. The ultrasonic input device 258 may use an input tool that generates an ultrasonic signal and enables the electronic device 201 to identify data by sensing the ultrasonic signal to a microphone (e.g., microphone 288).

The display 260 (e.g., the display 160) may include one of a panel 262, a hologram device 264, and a projector 266. The panel 262 may have the same or similar configuration to the display 160 of FIG. 1. The panel 262 may be configured to be at least one of flexible, transparent, and wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment of the present disclosure, the display 260 may further include a control circuit to control the panel 262, the hologram device 264, or the projector 266.

The interface 270 may include e.g., a HDMI 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition Link (MHL) interface, an SD card/multimedia card (MMC) interface, or infrared data association (IrDA) standard interface.

The audio module 280 may convert a sound into an electric signal or vice versa, for example. At least a part of the audio module 280 may be included in e.g., the input/output interface 150 as shown in FIG. 1. The audio module 280 may process sound information input or output through e.g., one of a speaker 282, a receiver 284, an earphone 286, and a microphone 288.

For example, the camera module 291 may be a device for capturing still images and videos, and may include, according to an embodiment of the present disclosure, at least one of one or more image sensors (e.g., front and back sensors), a lens, an ISP, and a flash such as a LED or xenon lamp.

The power manager module 295 may manage power of the electronic device 201, for example. Although not shown, according to an embodiment of the present disclosure, the power manager module 295 may include one of a power management integrated circuit (PMIC), a charger IC, a battery gauge, and a fuel gauge. The PMIC may have a wired and/or wireless recharging scheme. The wireless charging scheme may include e.g., one of a magnetic resonance scheme, a magnetic induction scheme, and an electromagnetic wave based scheme, and an additional circuit, such as a coil loop, a resonance circuit, a rectifier, and the like may be added for wireless charging. The battery gauge may measure an amount of remaining power of at least one of the battery 296, a voltage, a current, and a temperature while the battery 296 is being charged. The battery 296 may include, e.g., one of a rechargeable battery and a solar battery.

The indicator 297 may indicate a particular state of the electronic device 201 or a part (e.g., the processor 210) of the electronic device, including e.g., at least one of a booting state, a message state, and a recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components.

Figure 3:
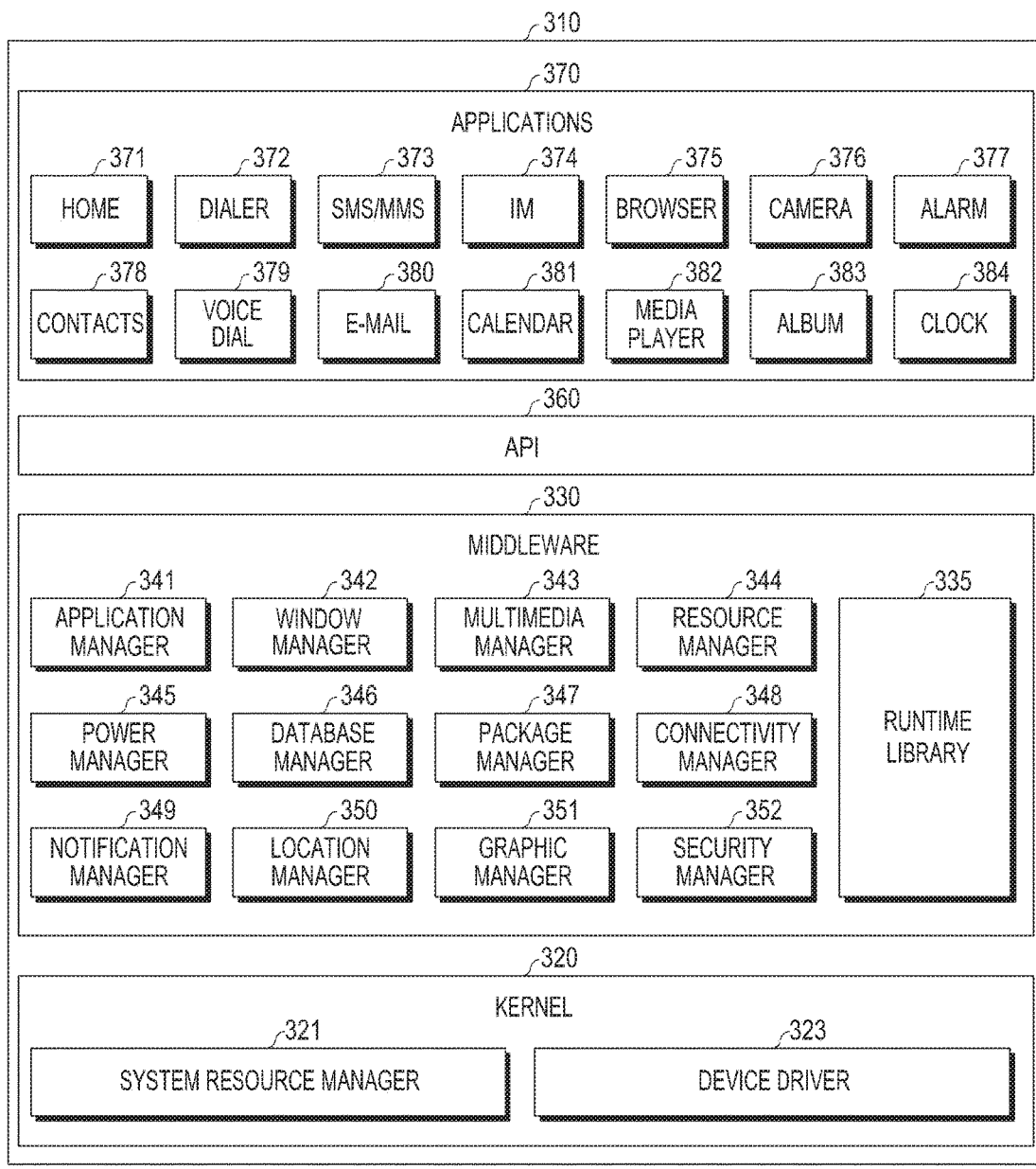
FIG. 3 is a block diagram illustrating a program module according to an embodiment of the present disclosure.

FIG. 3 is a block diagram illustrating a program module according to an embodiment of the present disclosure.

Referring to FIG. 3, according to an embodiment of the present disclosure, the program module 310 (e.g., the program 140) may include an OS controlling resources related to the electronic device (e.g., the electronic device 101) and/or various applications (e.g., the application 147) driven on the OS. The OS may include, e.g., one of Android, iOS, Windows, Symbian, Tizen, and Bada.

The program 310 may include, e.g., a kernel 320, middleware 330, an API 360, and/or applications 370. At least a part of the program module 310 may be preloaded on the electronic device or may be downloaded from an external electronic device (e.g., the external electronic devices 102 and 104) or a server (e.g., the server 106).

The kernel 320 (e.g., the kernel 141 of FIG. 1) may include, e.g., a system resource manager 321 or a device driver 323. The system resource manager 321 may perform control, allocation, or recovery of system resources. According to an embodiment of the present disclosure, the system resource manager 321 may include at least one of a process managing unit, a memory managing unit, and a file system managing unit. The device driver 323 may include, e.g., at least one of a display driver, a camera driver, a BT driver, a shared memory driver, a USB driver, a keypad driver, a Wi-Fi driver, an audio driver, and an inter-process communication (IPC) driver.

The middleware 330 may provide various functions to applications 370 through the API 360 so that the applications 370 may efficiently use limited system resources in the electronic device or provide functions jointly required by the applications 370. According to an embodiment of the present disclosure, the middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a compiler in order to add a new function through a programming language while, e.g., one of the applications 370 is being executed. The runtime library 335 may perform input/output management, memory management, or operation on arithmetic functions.

The application manager 341 may manage the life cycle of at least one application of, e.g., the applications 370. The window manager 342 may manage graphical user interface (GUI) resources used on the screen. The multimedia manager 343 may grasp formats necessary to play various media files and use a codec appropriate for a format to perform encoding or decoding on media files. The resource manager 344 may manage resources, such as source code of at least one of the applications 370, memory, and storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or BT. The notification manager 349 may display or notify an event, such as a coming message, appointment, or proximity notification, of the user without interfering with the user. The location manager 350 may manage location information of the electronic device. The graphic manager 351 may manage graphic effects to be offered to the user and their related UI. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the OS in order to provide a differentiated function. Further, the middleware 330 may dynamically omit some existing components or add new components.

The API 360 (e.g., the API 145) may comprise a set of, e.g., API programming functions and may have different configurations depending on OSs. For example, in the case of Android or iOS, one API set may be provided per platform, and in the case of Tizen, two or more API sets may be offered per platform.

The applications 370 (e.g., the application 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, contacts 378, a voice dial 379, an e-mail 380, a calendar 381, a media player 382, an album 383, a clock 384, a health-care (e.g., measuring the degree of workout or blood sugar, not shown), and provision of environmental information (e.g., provision of air pressure, moisture, or temperature information, not shown).

According to an embodiment of the present disclosure, the applications 370 may include an application (hereinafter, "information exchanging application" for convenience) supporting information exchange between the electronic device (e.g., the electronic device 101) and an external electronic device (e.g., the external electronic devices 102 and 104). Examples of the information exchange application may include, but is not limited to, one of a notification relay application for transferring specific information to the external electronic device and a device management application for managing the external electronic device.

For example, the notification relay application may include a function for relaying notification information generated from other applications of the electronic device (e.g., the SMS/MMS application, e-mail application, health-care application, or environmental information application) to the external electronic device (e.g., the external electronic devices 102 and 104). Further, the notification relay application may receive notification information from, e.g., the external electronic device and may provide the received notification information to the user.

The device management application may perform at least some functions of the external electronic device (e.g., the external electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the applications 370 may include an application (e.g., a health-care application of a mobile medical device) designated according to an attribute of the external electronic device (e.g., the external electronic devices 102 and 104). According to an embodiment of the present disclosure, the applications 370 may include an application received from the external electronic device (e.g., the server 106 or external electronic devices 102 and 104). According to an embodiment of the present disclosure, the applications 370 may include a preloaded application or a third party application downloadable from a server. The names of the components of the program module 310 according to an embodiment of the present disclosure may be varied depending on the type of OS.

According to an embodiment of the present disclosure, at least a part of the program module 310 may be implemented in software, firmware, hardware, or in a combination of two or more thereof. At least a part of the program module 310 may be implemented (e.g., executed) by e.g., a processor (e.g., the processor 120). At least a part of the program module 310 may include e.g., a module, program, routine, set of instructions, process, and the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically.

For example, the module may include at least one of application specific integrated circuit (ASIC) chips, field programmable gate arrays (FPGAs), and programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and DVDs, magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

Figure 4:
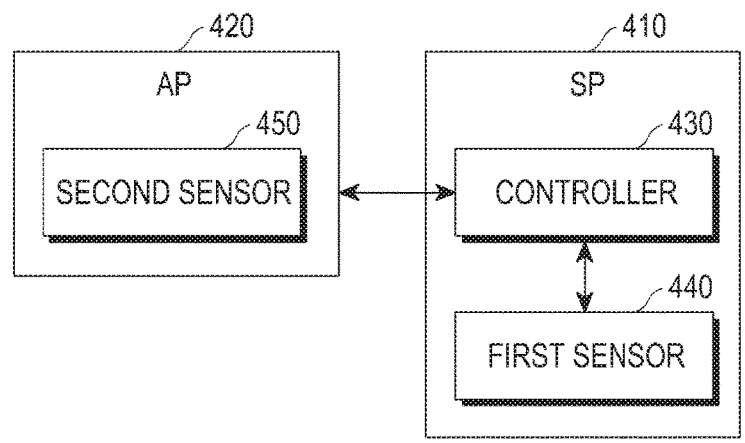
FIG. 4 is a view illustrating a configuration of an electronic device for providing location information according to an embodiment of the present disclosure.

FIG. 4 is a view illustrating a configuration of an electronic device for providing location information according to an embodiment of the present disclosure.

Referring to FIG. 4, according to an embodiment of the present disclosure, the electronic device may control the acquisition of location information between a first processor (e.g., the SP 410) that may be included in at least one processor (e.g., the processor 120 of FIG. 1) and operable at a first power level (e.g., a low-power level) and a second processor (e.g., the AP 420) operable at a second power level (e.g., a high-power level). The electronic device may control the acquisition of location information through the SP 410 operable with low power, minimizing the wakeup of the AP 420 operable with high power for obtaining location information.

The SP 410 may be a processor that may be provided separately from the AP 420 and configured to be optimized for low-power operations to consume less power than the AP 420. The SP 410 may be configured to control at least one sensor while the AP 420 is in a deactivated state, low-power state, or sleep state. For example, the SP 410 may comprise a processor configured to control a communication module (e.g., one of a GPS module, a Wi-Fi module, a BT module, an NFC module, and an RF module) or a processor configured to control a sensor module (e.g., one of an acceleration sensor, a gyro sensor, a geomagnetic sensor, and an altitude sensor).

According to an embodiment of the present disclosure, the SP 410 may include a controller 430 and a first sensor 440.

The first sensor 440 may include at least one sensor that may position the electronic device. For example, the first sensor 440 may include a GPS module that may position the electronic device on its own even while the AP 420 is in the deactivated state, low-power state, or sleep mode state. The first sensor 440 may perform positioning in an open zone and may obtain location information with high accuracy.

The controller 430 may perform control to obtain location information using the first sensor 440. The controller 430, upon failure to obtain location information using the first sensor 440, may transmit, to the AP 420, a notification (e.g., a location information acquisition request) corresponding to the failure to obtain location information to receive location information obtained by the AP 420.

The AP 420 may perform the overall control on the electronic device and may control the operation of other components of the electronic device. The AP 420 may control the execution of various applications. For example, the AP 420 may control the execution of an application for providing a geo-fence service. Further, the AP 420 may enter a sleep mode or low-power mode for deactivation to reduce power consumption, and when a control operation is required, the AP 420 may switch to a wakeup mode.

According to an embodiment of the present disclosure, the AP 420 may include a second sensor 450.

The second sensor 450 may include at least one sensor that may position the electronic device under the control of the AP 420 while the AP 420 is in the wakeup mode. For example, the second sensor 450 may include at least one of a cell-based location information providing module, a Wi-Fi-based location information providing module, and a sensor-based location information providing module. The second sensor 450 may perform positioning in an open zone or shadow zone and may obtain location information with a relatively low accuracy as compared with the first sensor 440.

Figure 5:
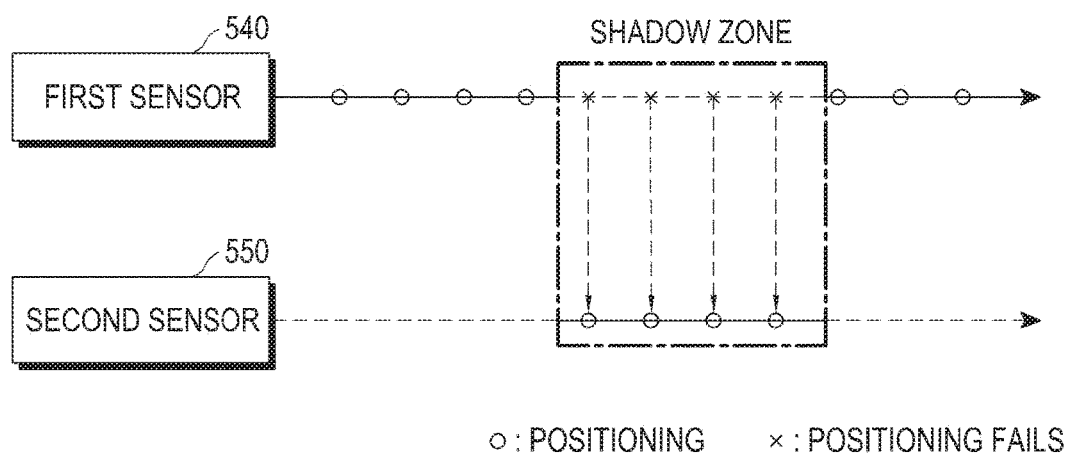
FIG. 5 is a view illustrating a method for obtaining location information according to an embodiment of the present disclosure.

FIG. 5 is a view illustrating a method for obtaining location information according to an embodiment of the present disclosure.

Referring to FIG. 5, according to an embodiment of the present disclosure, the electronic device may obtain location information using the first sensor 540 when required to obtain location information at a predetermined period, such as for a geo-fence service. The first sensor 540 may obtain location information in an open zone, e.g., an area where signals may be received from a GPS satellite, but might not receive location information in a shadow zone, such as, e.g., inside a building, underground, tunnel, dense building area, or under an overpass where no or fewer signals may be received from GPS satellite. Accordingly, the first sensor 540 may obtain location information at a predetermined period in the open zone, and upon failure to obtain location information using the first sensor 540, the first sensor 540 sends a request for obtaining location information to the second sensor 550 to obtain location information using the second sensor 550. According to an embodiment of the present disclosure, when reception of a signal related to positioning through the first sensor 540 fails, the received signal has a weak strength, or an inaccurate signal is received, or the electronic device has an internal operation error, the acquisition of location information may fail.

As such, according to an embodiment of the present disclosure, when the period of obtaining location information is determined, the electronic device may attempt positioning to obtain location information using the first sensor 540 according to the period of obtaining location information regardless of whether it is in the open or shadow zone, and only when it fails to obtain location information using the first sensor 540, the electronic device may attempt positioning to obtain location information using the second sensor 550. Upon succeeding to obtain location information using the first sensor 540, the second sensor 550 might not attempt to perform positioning. Further, the first sensor 540 might not attempt to do positioning for determining the escape from the shadow zone. That is, the first sensor 540 may attempt to do positioning only according to the determined period of obtaining location information regardless of whether the electronic device is in the open or shadow zone, and even when positioning is performed in the shadow zone, the first sensor 540 does not attempt to perform positioning at a separate period for determining whether to escape from the shadow zone.

Figure 6:
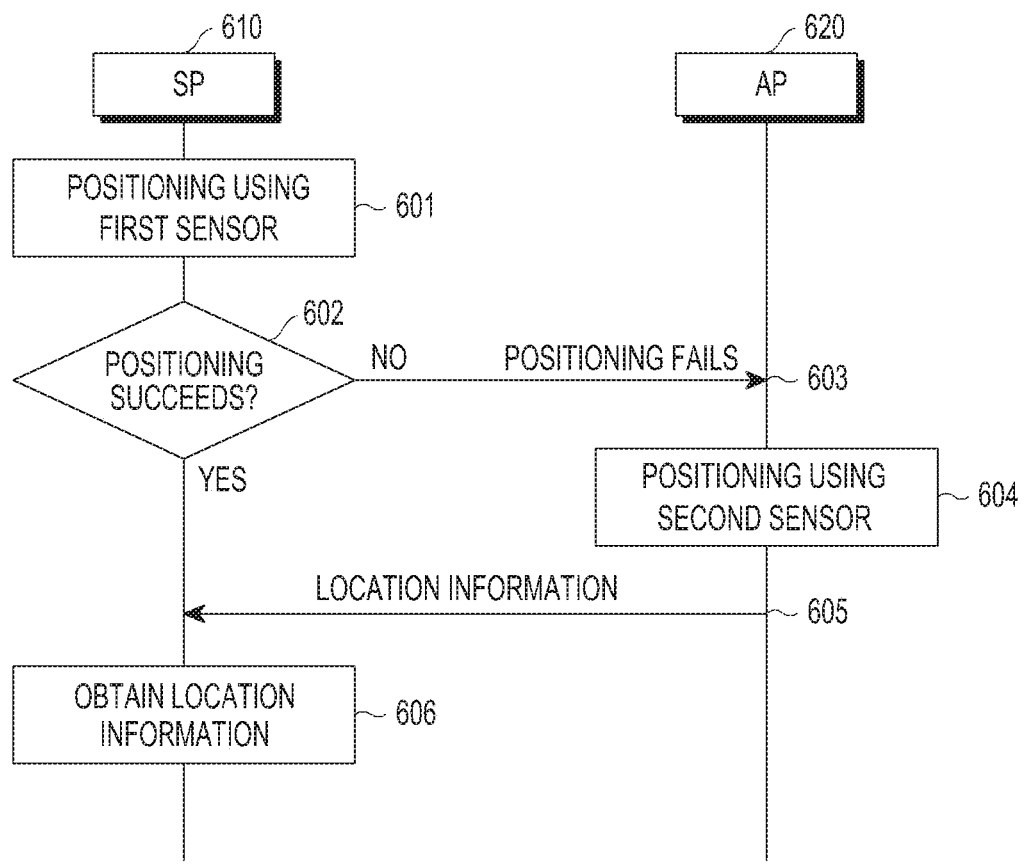
FIG. 6 is a flowchart illustrating a process for obtaining location information according to an embodiment of the present disclosure.

FIG. 6 is a flowchart illustrating a process for obtaining location information according to an embodiment of the present disclosure.

Referring to FIG. 6, in operation 601, the SP 610 may attempt to perform positioning using the first sensor (e.g., the first sensor 440). The first sensor may comprise a GPS module that may receive a signal from a satellite in an open zone to perform positioning.

In operation 602, the SP 610 may determine whether the positioning using the first sensor succeeds and, when it is determined that the positioning using the first sensor does not succeed in operation 601, the SP 610 may transmit, to the AP 620, a notification (e.g., a location information acquisition request) corresponding to the failure to obtain location information in operation 603. At this time, the AP 620 may be in a deactivated state, a sleep mode or low-power mode state of the AP 620 to reduce power consumption.

In operation 604, the AP 620 may switch from the sleep mode or low-power mode to a wakeup mode according to the location information acquisition request to attempt positioning using the second sensor (e.g., the second sensor 450). The second sensor may include at least one of a cell-based location information providing module, a Wi-Fi-based location information providing module, and a sensor-based location information providing module that may perform positioning in both the open zone and shadow zone and may be driven in the wakeup mode of the AP 620.

In operation 605, the AP 620 may transmit, to the SP 610, location information obtained by the positioning using the second sensor.

In operation 606, when the positioning using the first sensor succeeds in operation 601, as determined in operation 602, the SP 610 may obtain location information using the first sensor, and when the positioning using the first sensor fails to succeed, as determined in operation 602, the SP 610 may obtain location information by receiving the location information obtained using the second sensor as received from the AP 620.

Figure 7:
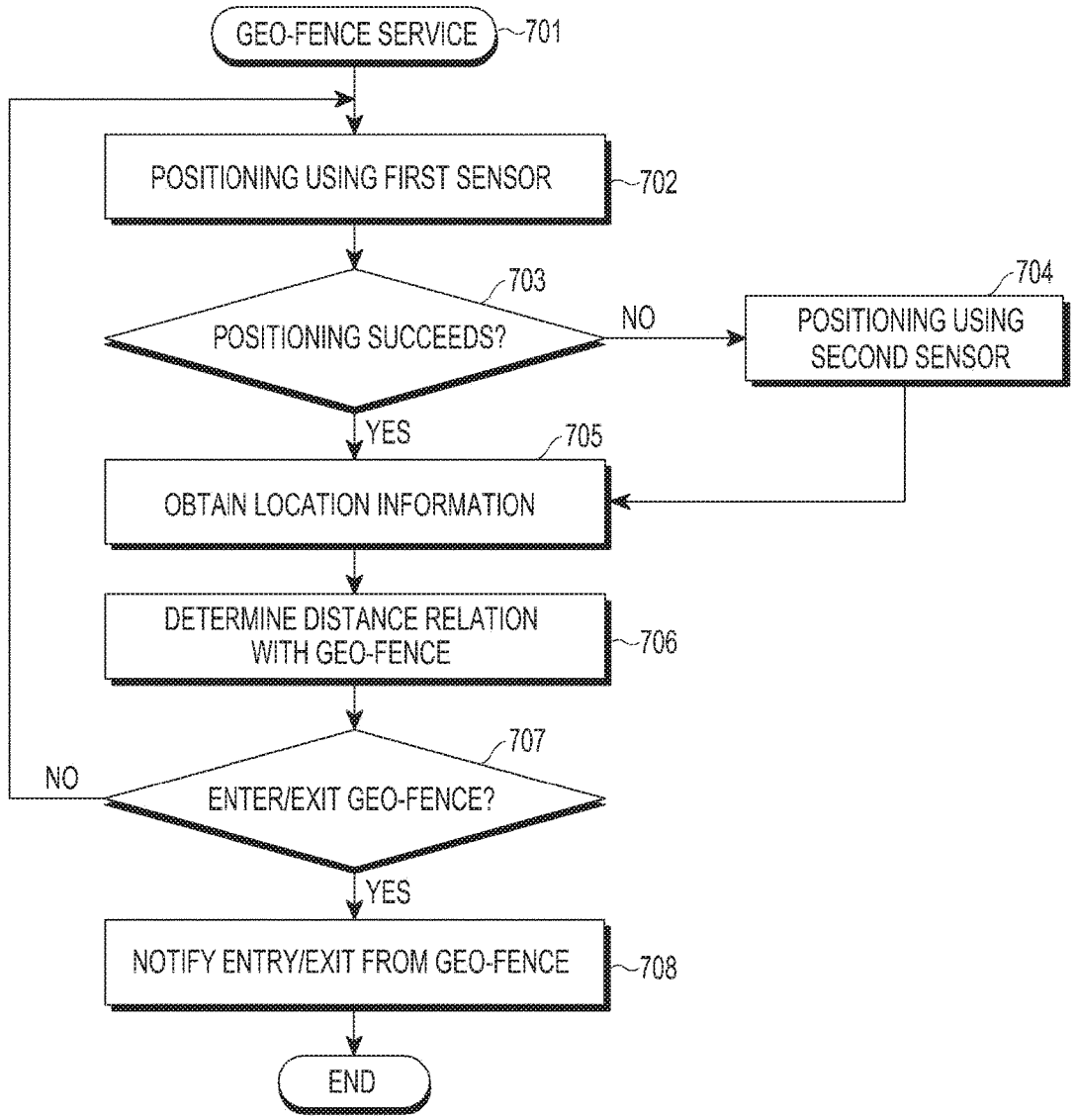
FIG. 7 is a flowchart illustrating a process for providing a geo-fence service by obtaining location information according to an embodiment of the present disclosure.

FIG. 7 is a flowchart illustrating a process for providing a geo-fence service by obtaining location information according to an embodiment of the present disclosure.

More specifically, FIG. 7 is a process for an SP of an electronic device to provide a geo-fence service by obtaining location information according to an embodiment of the present disclosure.

Referring to FIG. 7, in operation 701, the electronic device, upon request of a geo-fence service, may receive geo-fence-related data from a geo-fence server. The data may include geo-fence location information including the position and measure of the geo-fence. The geo-fence service may be activated by running a geo-fence service application installed on the AP. A request for a location information monitoring operation for obtaining location information for the geo-fence service and determining whether to enter or exit the geo-fence may be sent to the SP, and the acquisition of the location information of the geo-fence service and a determination as to whether to enter or exit the geo-fence may thereafter be performed by the SP.

In operation 702, the SP (e.g., the SP 410) of the electronic device may attempt positioning using the first sensor (e.g., the first sensor 440).

In operation 703, the SP of the electronic device determines whether the positioning using the first sensor succeeds and, when it is determined that the positioning using the first sensor in operation 702 does not succeed, the SP may request the AP (e.g., the AP 420) to obtain location information. At this time, the AP may be in a deactivated state, a sleep mode or low-power mode state of the AP 620 to reduce power consumption.

In operation 704, the AP of the electronic device may switch from the sleep mode or low-power mode to the wakeup mode according to the location information acquisition request from the SP, attempt positioning using the second sensor (e.g., the second sensor 450) to obtain location information, and transmit the obtained location information to the SP.

In operation 705, when the positioning using the first sensor succeeds in operation 702, as determined in operation 703, the SP of the electronic device may obtain location information using the first sensor, and when the positioning using the first sensor fails to succeed in operation 702, as determined in operation 703, the SP may obtain location information by receiving the location information obtained using the second sensor as received from the AP.

In operation 706, the SP of the electronic device may determine a distance relation with the geo-fence using the obtained location information. The SP of the electronic device may compare the obtained location information with geo-fence location information as per the geo-fence service request and determine a distance until the electronic device arrives at a border of the geo-fence with respect to the center of the geo-fence. Further, when the electronic device is located at the border of the geo-fence, a distance until it arrives at the geo-fence border with respect to the location of the electronic device may be determined. Further, as the distance relation with the geo-fence, the SP may compare location information obtained at a prior time with location information obtained at the current time and determine the travel distance of the electronic device and a variation in distance made as the electronic device travels.

In operation 707, the SP of the electronic device may determine whether the electronic device enters or exits the geo-fence according to the distance relation with the geo-fence. That is, when the obtained location information on the electronic device is determined to be located within the geo-fence border, the electronic device may be determined to be within the geo-fence, and when the obtained location information on the electronic device is determined to be outside the geo-fence border, the electronic device may be determined to be located outside the geo-fence. Further, regarding the determination as to whether the electronic device enters the geo-fence, when it is determined that the location information obtained at the prior time was located out of the geo-fence border but the location information obtained at the current time is within the geo-fence border, the electronic device may be determined to have entered the geo-fence. Further, regarding the determination as to whether the electronic device exits the geo-fence, when it is determined that the location information obtained at the prior time was located within the geo-fence border but the location information obtained at the current time is out of the geo-fence border, the electronic device may be determined to have exited the geo-fence.

In operation 708, upon determining in operation 707 that the electronic device enters or exits the geo-fence, the SP of the electronic device may transmit a result of the determination to the AP and enable the AP to thereafter provide a geo-fence service.

Figure 8:
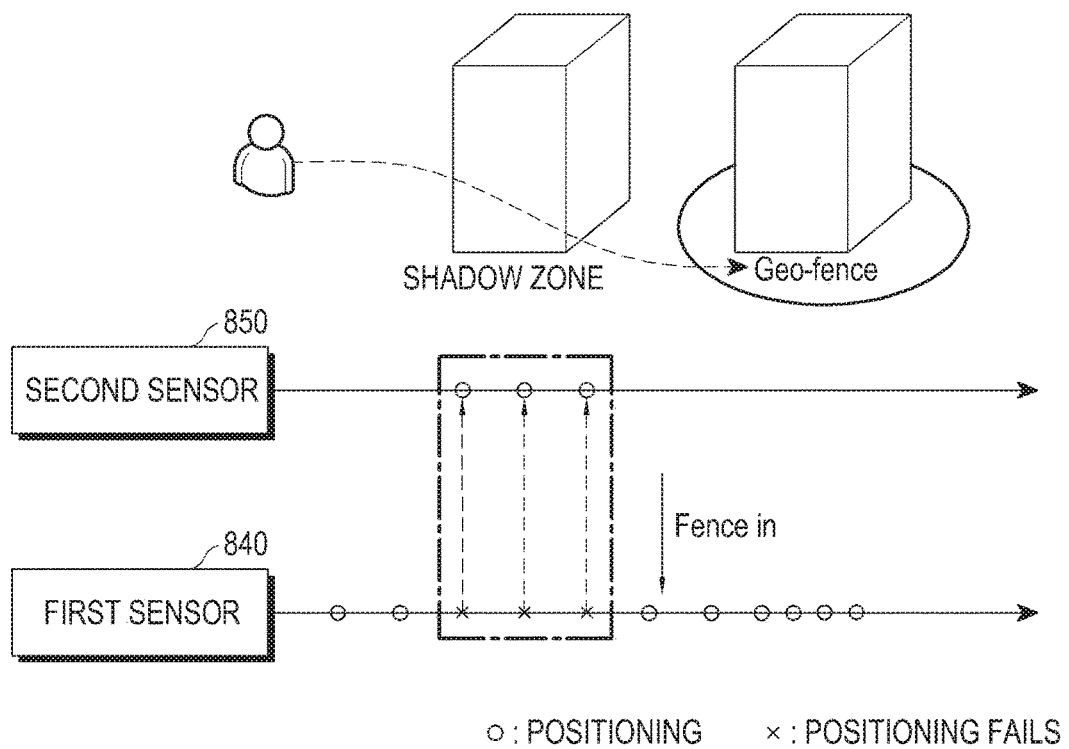
FIGS. 8, 9A, and 9B are views illustrating a method for providing a geo-fence service by obtaining location information according to various embodiments of the present disclosure.
Figure 9A:
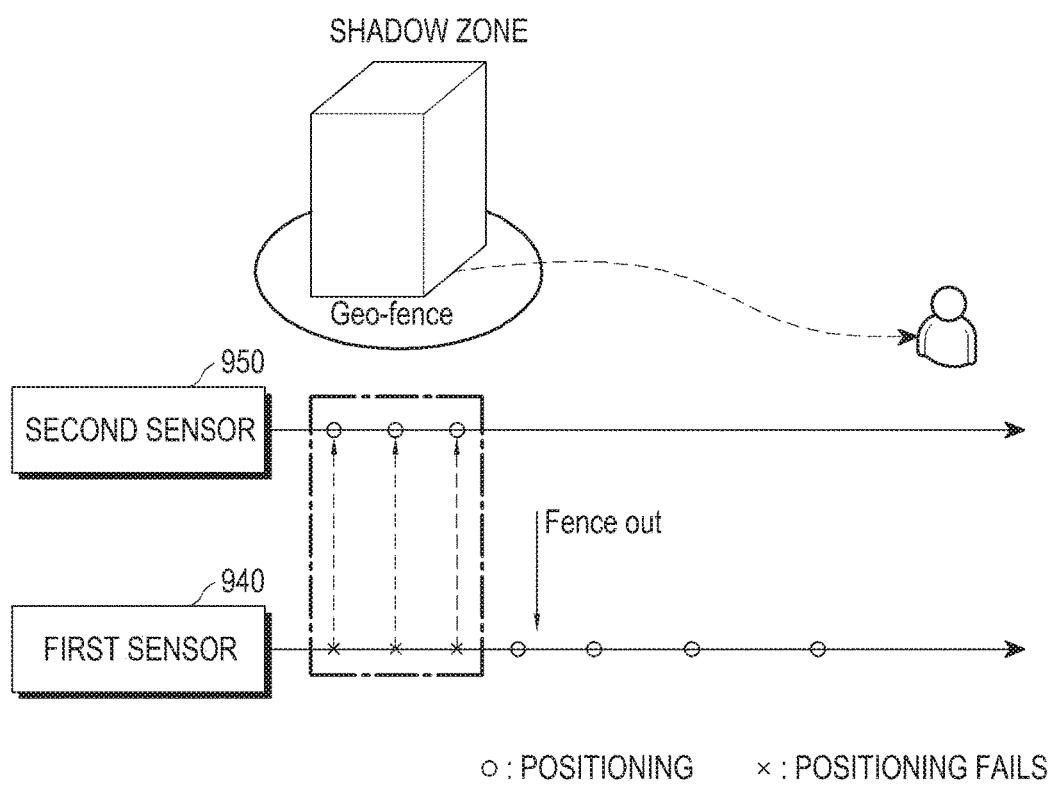
Figure 9B:
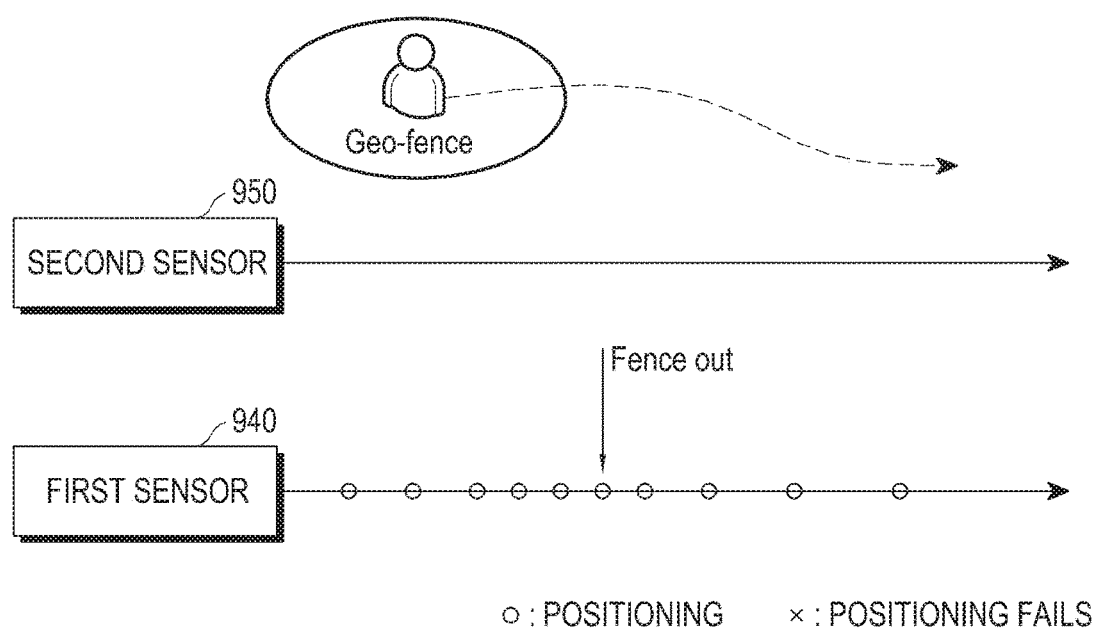

FIGS. 8, 9A, and 9B are views illustrating a method for providing a geo-fence service by obtaining location information according to various embodiments of the present disclosure. FIG. 8 assumes that the electronic device enters from outside the geo-fence into the geo-fence, and FIGS. 9A and 9B assume that the electronic device exits from the geo-fence to outside the geo-fence.

Referring to FIG. 8, according to an embodiment of the present disclosure, the electronic device may obtain location information using the first sensor 840 according to a geo-fence service. The electronic device may compare the obtained location information with the location information on the geo-fence, and when determining to be located out of the geo-fence, determine a period of obtaining location information to determine whether to enter the geo-fence. According to the determined period of obtaining location information, the electronic device may obtain location information using the first sensor 840 and, upon failure to obtain location information using the first sensor 840, the electronic device may obtain location information using the second sensor 850. When the obtained location information is determined to be that the electronic device has performed entry into the geo-fence, a geo-fence service according to the entry into the geo-fence may be provided, and location information may be obtained according to a predetermined period of obtaining location information in the geo-fence to determine whether the electronic device remains within the geo-fence or exits the geo-fence.

Referring to FIGS. 9A and 9B, according to an embodiment of the present disclosure, the electronic device may obtain location information using the first sensor 940 according to a geo-fence service. At this time, upon failure to obtain location information using the first sensor 940, the electronic device may obtain location information using the second sensor 950. The electronic device may compare the obtained location information with the location information of the geo-fence, and when determined to be within the geo-fence, may obtain location information according to a predetermined period of obtaining location information in the geo-fence to determine whether the electronic device exits the geo-fence.

As shown in FIG. 9A, in the case that the geo-fence comprises a shadow zone, upon failure to obtain location information using the first sensor 940, the electronic device may obtain location information using the second sensor 950. When the electronic device is determined, based on the location information obtained using the second sensor 950, to exit the geo-fence, the electronic device may terminate the geo-fence service as the electronic device exits the geo-fence, and the electronic device may re-determine a period of obtaining location information to determine whether to enter back into the geo-fence and obtain location information using the first sensor 940 according to the determined period of obtaining location information. The location information acquisition period may increase as the distance between the electronic device and the geo-fence increases or may decrease as the distance decrease.

According to an embodiment of the present disclosure, as shown in FIG. 9B, when the electronic device is located within the geo-fence, the electronic device may vary the period of obtaining location information according to the distance from the geo-fence border. For example, as the distance between the electronic device and the geo-fence border decreases (e.g., as the electronic device comes closer to the border), the period may decrease, and as the distance increases (e.g., as the electronic device goes away from the border), the period may increase. Further, even when the electronic device is located out of the geo-fence, the electronic device may vary the period of obtaining location information according to the distance from the geo-fence border. For example, as the distance between the electronic device and the geo-fence border decreases (e.g., as the electronic device comes closer to the border), the period may decrease, and as the distance increases (e.g., as the electronic device goes away from the border), the period may increase.

Figure 10:
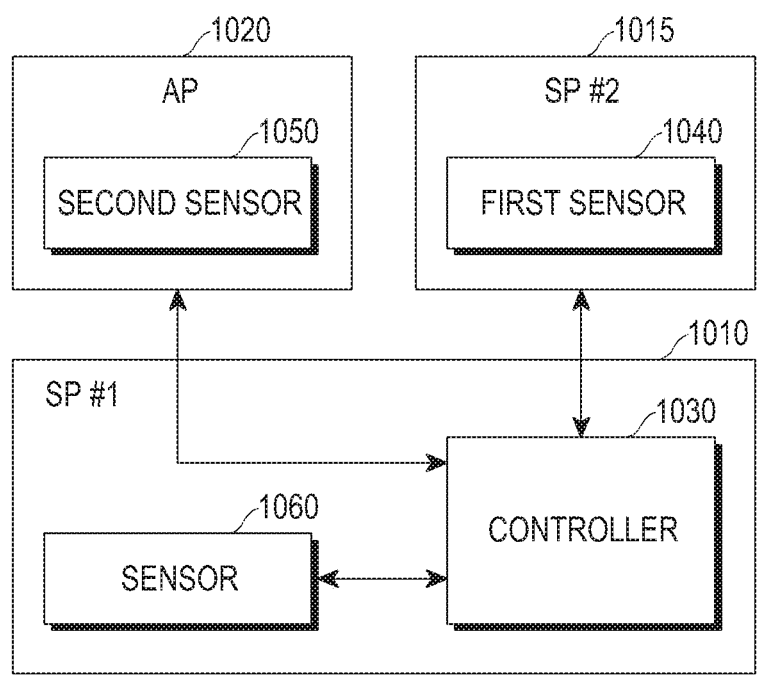
FIG. 10 is a view illustrating a configuration of an electronic device for providing location information according to an embodiment of the present disclosure.

FIG. 10 is a view illustrating a configuration of an electronic device for providing location information according to an embodiment of the present disclosure.

Referring to FIG. 10, according to an embodiment of the present disclosure, the electronic device may control the acquisition of location information between a first processor (e.g., the SP #1 1010 or SP #2 1015) that may be included in at least one processor (e.g., the processor 120 of FIG. 1) and operable at a first power level (e.g., a low-power level) and a second processor (e.g., the AP 1020) operable at a second power level (e.g., a high-power level). The electronic device may control the acquisition of location information through the SP #1 1010 operable with low power, minimizing the wakeup of the AP 1020 operable with high power for obtaining location information.

The SP #1 1010 or SP #2 1015 may comprise a processor that may be provided separately from the AP 1020 and configured to be optimized for low-power operations to consume less power than the AP 1020. The SP #1 1010 or SP #2 1015 may be configured to control at least one sensor and may control at least one sensor while the AP 1020 is in a deactivated state, low-power state, or sleep state. For example, the SP #1 1010 or SP #2 1015 may comprise a processor configured to control a communication module (e.g., one of a GPS module, a Wi-Fi module, a BT module, an NFC module, and an RF module) or a processor configured to control a sensor module (e.g., one of an acceleration sensor, a gyro sensor, a geomagnetic sensor, and an altitude sensor).

According to an embodiment of the present disclosure, the SPs 1010 and 1015 may be described as a first SP #1 1010 and a second SP #2 1015, respectively, depending on the configuration or function of the sensor.

The first SP #1 1010 may include a controller 1030 and a sensor 1060, and the second SP #2 1015 may include a first sensor 1040. According to an embodiment of the present disclosure, the sensors or functions included in the first and second SPs 1010 and 1015 may be configured in opposite forms from each other or may be integrated with each other.

The first SP #1 1010 may comprise, e.g., a sensor hub that may control various sensors of the electronic device, and the second SP #2 1015 may comprise a GPS control module that may control the GPS module of the electronic device.

The first sensor 1040 may include at least one sensor that may position the electronic device. For example, the first sensor 1040 may comprise a GPS module that may position the electronic device on its own even when the AP 1020 is in sleep mode or low-power mode. The first sensor 1040 may perform positioning in an open zone and may obtain location information with high accuracy.

The sensor 1060 may include at least one sensor. The sensor may include, e.g., at least one of a gesture sensor, a gyro sensor, an air pressure sensor, a geo-magnetic sensor, an acceleration sensor, a grip sensor, a proximity sensor, a color sensor (e.g., a RGB sensor), a bio sensor, a temperature/humidity sensor, an illumination sensor, an UV sensor, an e-nose sensor, an EMG sensor, an EEG sensor, an ECG sensor, an IR sensor, an iris sensor, and a fingerprint sensor.

According to an embodiment of the present disclosure, the first sensor 1040 or the sensor 1060 may be positioned outside the electronic device. The first sensor 1040 or the sensor 1060 may be functionally connected with the first SP 1010 or the second SP 1015. For example, the electronic device may receive sensing data from a sensor module outside the electronic device through a network. The first SP 1010 or the second SP 1015 may communicate sensing data with the first sensor 1040 or the sensor 1060 based on low-power communication (e.g., BT or Zigbee). According to an embodiment of the present disclosure, the first sensor 1040 or the sensor 1060 may include a sensor node configuring an IoT.

According to an embodiment of the present disclosure, the sensor 1060 including at least one sensor may include at least one of an acceleration sensor, a gyro sensor, a geo-magnetic sensor, an altitude sensor, and a short-range wireless discovery sensor, and the short-range wireless discovery sensor may be driven in a deactivated state, a sleep mode or low-power mode of the first SP 1010, and it may include at least one of a Wi-Fi module, a BT module, an RF identification (RFID) module, an IR sensor, and an ultrasonic sensor that may function as the short-range wireless discovery sensor.

The controller 1030 may control the first sensor 1040 to obtain location information. The controller 1030, upon failure to obtain location information using the first sensor 1040, may transmit, to the AP 1020, a notification (e.g., a location information acquisition request) corresponding to the failure to obtain location information to receive location information obtained by the AP 1020. Further, the controller 1030 may determine a period of obtaining location information based on data obtained using the sensor 1060 and may obtain location information according to the determined period of obtaining location information.

According to an embodiment of the present disclosure, the controller 1030 may collect at least one piece of sensing data obtained from the sensor 1060 and produce context data regarding the recognition of the motion state of the electronic device using, at least, the piece of sensing data. In recognizing the motion state of the electronic device, sensing data obtained from, e.g., one of the acceleration sensor, gyro sensor, geo-magnetic sensor, and altitude sensor included in the sensor 1060 may be compared with a characteristic pattern of waveform according to each preset motion state to produce the context data having determined the motion state of the electronic device. That is, from the pattern, such as period, strength, or vibration of the sensing data obtained from the sensor, the context data representing the motion state (e.g., sitting, standing, walking, running, biking, or driving), moving speed, and moving direction of the user carrying the electronic device may be produced. Further, the electronic device may estimate the current location of the electronic device by comparing the short-range wireless discovery data obtained from the short-range wireless discovery sensor with per-location cell ID or Wi-Fi list information previously stored.

The controller 1030 may determine the period at which the electronic device obtains location information based on the data obtained using the sensor 1060. For example, the controller 1030 may detect a variation in the motion of the electronic device based on data obtained using the acceleration sensor, gyro sensor, geo-magnetic sensor, and altitude sensor that may detect the motion state of the electronic device in the sensor 1060, estimate the moving distance and/or direction of the electronic device expected according to the variation in motion, and determine the period of obtaining location information of the electronic device. For example, when the motion state is sitting or standing, the electronic device is determined to cause a variation in its moving distance while remaining stationary, and thus, the controller 1030 may determine to increase the period of obtaining location information or may temporarily stop obtaining location information. Further, when the motion state is walking or running, the electronic device is determined to cause a little variation in its moving distance at a low moving speed, and thus, the controller 1030 may determine that the period of obtaining location information is shorter than when the motion state is standing but longer than when the motion state is biking or driving. Further, when the motion state is biking or driving, the electronic device is determined to cause a significant variation in its moving distance at a high moving speed, and thus, the controller 1030 may determine to reduce the period of obtaining location information.

The AP 1020 may perform the overall control of the electronic device and may control the operation of other components of the electronic device. The AP 1020 may control the execution of various applications. For example, the AP 1020 may control the execution of an application for providing a geo-fence service. Further, the AP 1020 may enter a sleep mode or low-power mode for deactivation to reduce power consumption, and when a control operation is required, the AP 420 may switch to a wakeup mode.

According to an embodiment of the present disclosure, the AP 1020 may include a second sensor 1050.

The second sensor 1050 may include at least one sensor that may position the electronic device under the control of the AP 1020 while the AP 1020 is in the wakeup mode. For example, the second sensor 1050 may include at least one of a cell-based location information providing module, a Wi-Fi-based location information providing module, and a sensor-based location information providing module. The second sensor 1050 may perform positioning in an open zone or shadow zone and may obtain location information with a relatively low accuracy as compared with the first sensor 1040.

Figure 11:
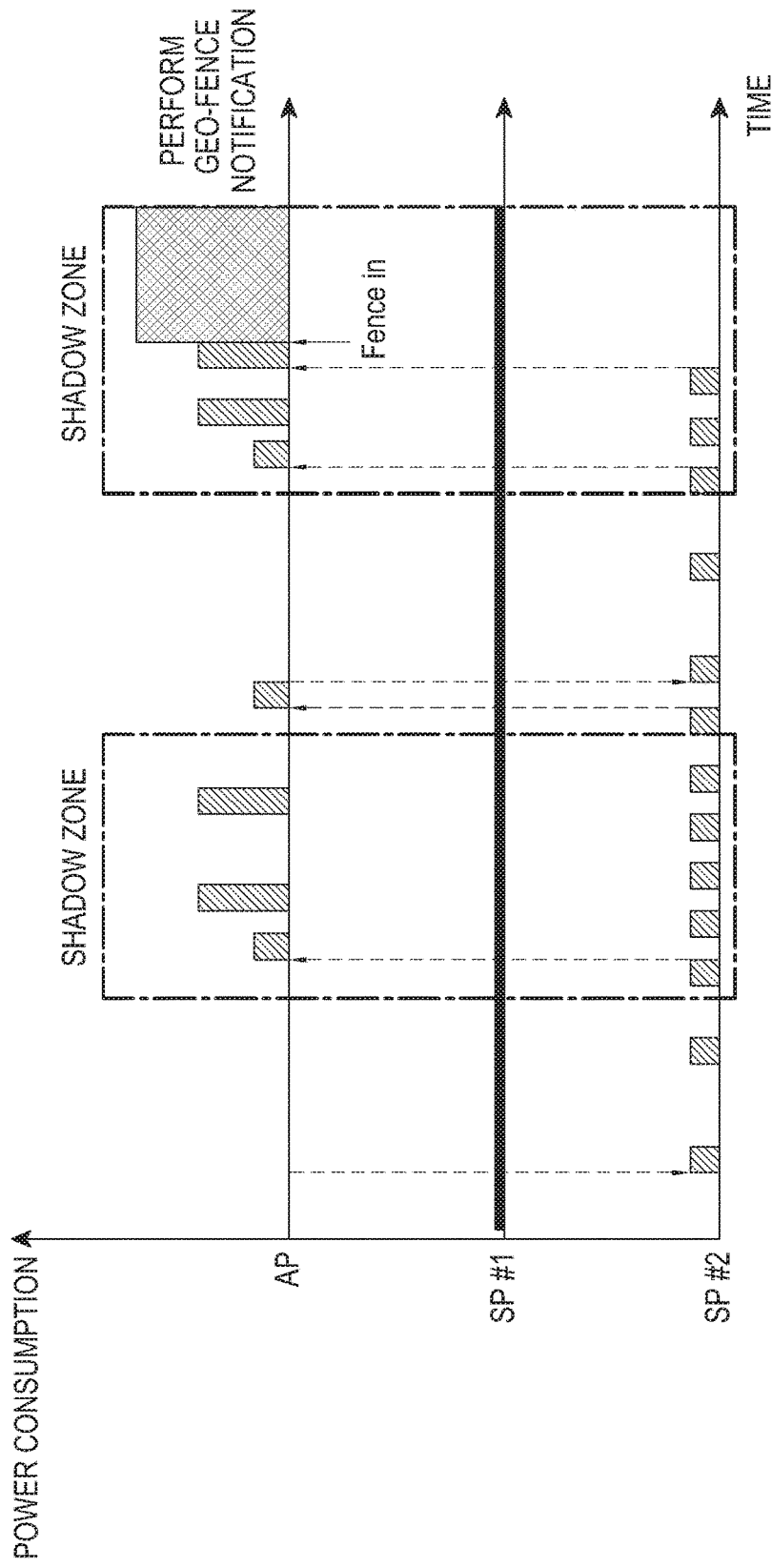
FIG. 11 is a view illustrating a method for providing a geo-fence service by obtaining location information by a general electronic device according to an embodiment of the present disclosure.
Figure 12:
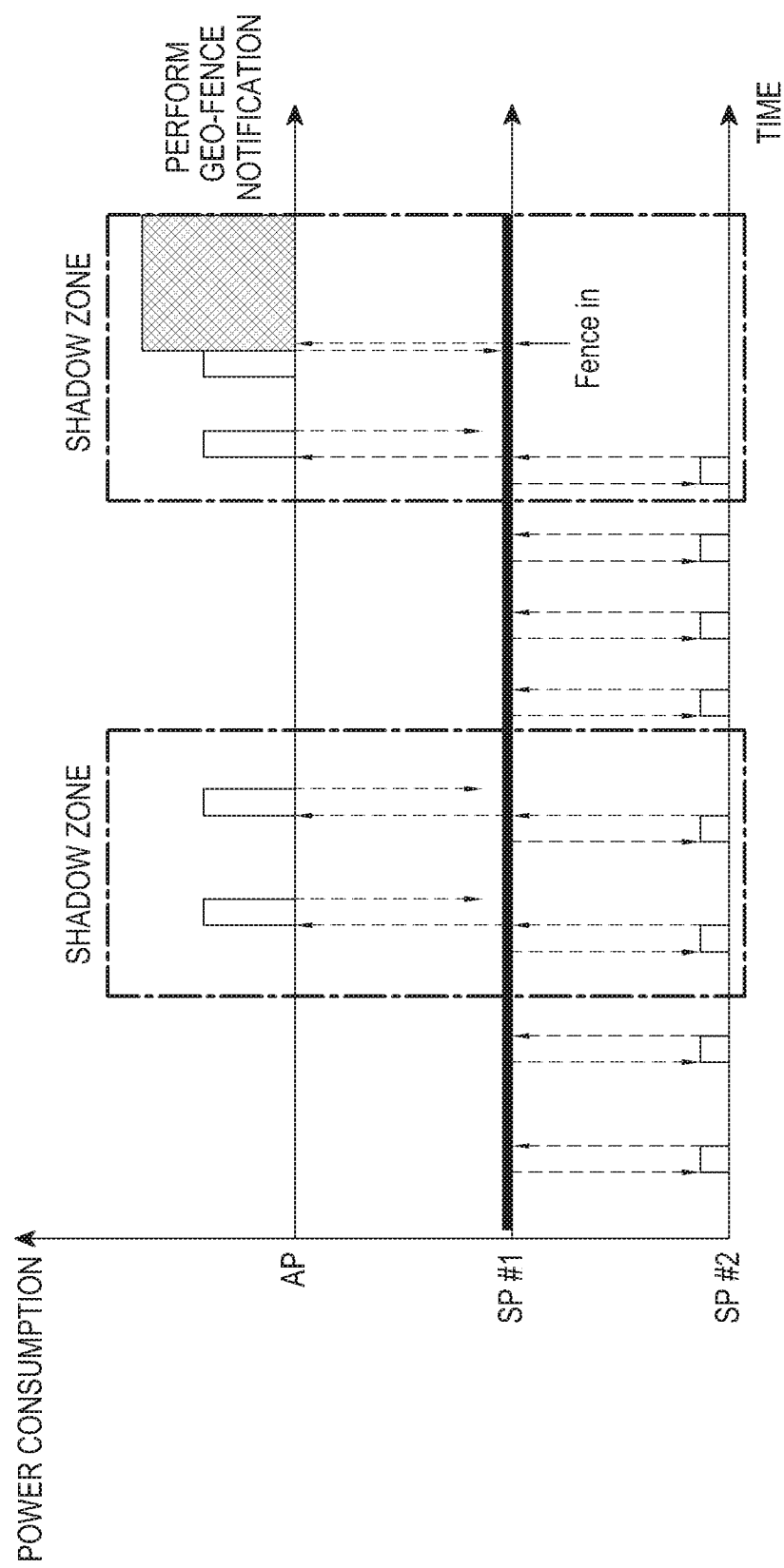
FIG. 12 is a view illustrating a method for providing a geo-fence service by obtaining location information according to an embodiment of the present disclosure.

FIG. 11 is a view illustrating a method for providing a geo-fence service by obtaining location information in a general electronic device according to the related art. FIG. 12 is a view illustrating a method for providing a geo-fence service by obtaining location information according to an embodiment of the present disclosure.

Generally, the AP of the electronic device may provide a geo-fence service by obtaining location information, and the AP may obtain location information and determine whether to enter or exit a geo-fence for a geo-fence service. Referring to FIG. 11, when a geo-fence service is activated, the AP may request the first SP (hereinafter, denoted as a sensor hub) to monitor a variation in the motion of the electronic device. Upon detecting a particular variation in motion, the AP may receive a result of the detected variation in motion. The AP may determine a period of obtaining location information to determine whether to enter or exit the geo-fence based on the motion state of the electronic device received from the sensor hub and request the second SP (hereinafter, denoted as a GPS module) to obtain location information according to the location information acquisition period. Then, the GPS module may attempt to perform positioning according to the location information acquisition period to obtain location information. When the positioning fails, the GPS module notifies the AP of a result of the failure to obtain location information, and the AP determines that it is impossible to obtain location information through the GPS module and drives a network-based location information providing module under the control of the AP to obtain location information. At this time, the GPS module may continue to attempt to perform positioning at a relatively short period than the location information acquisition period in order to determine whether to escape from the shadow zone. When the positioning succeeds, the GPS module notifies the AP of a result of success in obtaining location information, and the AP determines that it is possible to obtain location information through the GPS module and request the GPS module to resume positioning according to the location information acquisition period. Such process may go on until the electronic device enters the geo-fence area, and when the AP determines that there is entry into the geo-fence based on the obtained location information, a geo-fence service according to the entry into the geo-fence may be provided.

As such, the process where the general electronic device obtains location information according to a geo-fence service may end up with increased power consumption because the AP both obtains location information and determines whether to enter or exit the geo-fence. When the electronic device enters or exits the shadow zone, the AP wakes up, requiring a control operation for the electronic device to obtain location information. For such reasons, the GPS module also frequently attempts positioning in order to determine whether to escape from the shadow zone, causing additional power consumption.

By contrast, a method for providing a geo-fence service by obtaining location information in an electronic device according to an embodiment of the present disclosure may perform the acquisition of location information and determination as to whether to enter or exit a geo-fence for a geo-fence service by an SP. Referring to FIG. 12, when a geo-fence service is activated, the SP may monitor a variation in the motion of the electronic device, determine a period of obtaining location information to determine whether to enter or exit the geo-fence based on the motion state of the electronic device, and request the second SP (hereinafter, denoted as a GPS module) to obtain location information according to the location information acquisition period. Then, the GPS module may attempt to perform positioning according to the location information acquisition period to obtain location information. Upon failure to obtain location information using the GPS module, the first SP may immediately request the AP to obtain location information to obtain location information under the control of the AP. Further, the first SP may adjust the location information acquisition period according to a distance relation between the obtained location information and the geo-fence. Such process may last until the electronic device enters the geo-fence area. Upon determining that the electronic device enters the geo-fence area, the first SP may notify the AP of a result of the entry into the geo-fence to enable a geo-fence service according to the entry into the geo-fence to be provided by the AP.

As such, in the process of obtaining location information according to a geo-fence service in an electronic device according to an embodiment of the present disclosure, location information may be obtained as per the location information acquisition period set regardless of whether the electronic device is in an open or shadow zone, and such an operation where the GPS determines the escape from the shadow zone in the shadow zone may be eliminated. Further, the wakeup mode of the AP may temporarily arise only when positioning is required in the shadow zone, thus leading to minimized power consumption of the electronic device.

Figure 13:
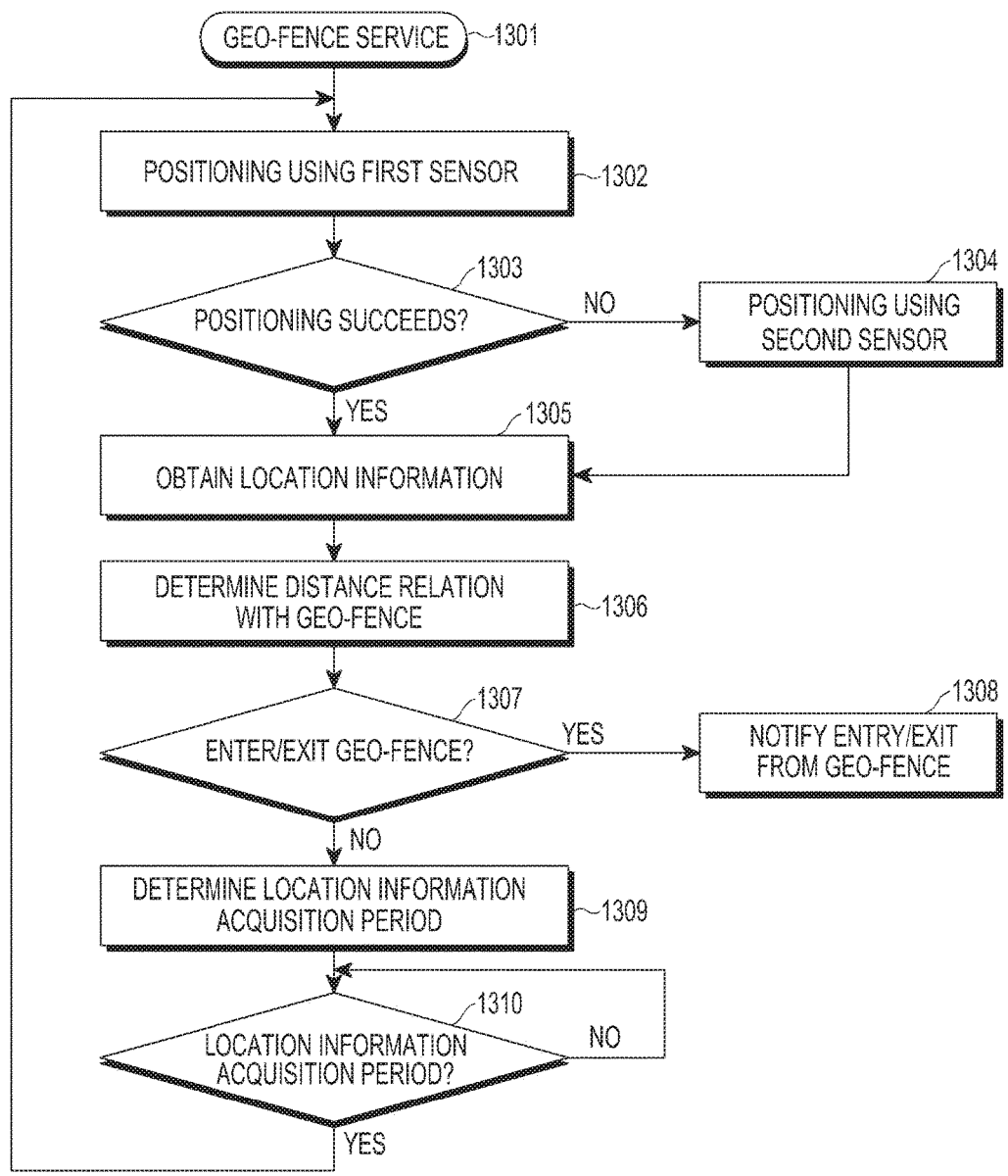
FIG. 13 is a flowchart illustrating a process for providing a geo-fence service by obtaining location information according to an embodiment of the present disclosure.
Figure 14:
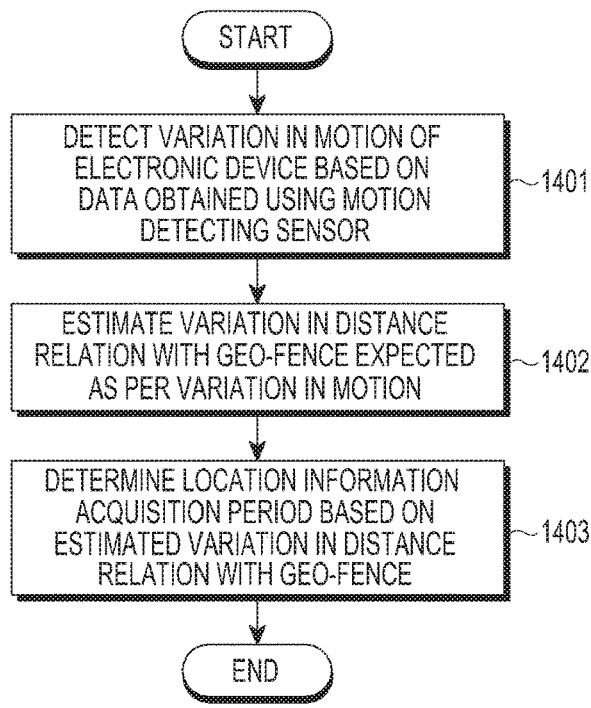
FIGS. 14 and 15 are flowcharts illustrating a process for determining the period of obtaining location information according to an embodiment of the present disclosure.
Figure 15:
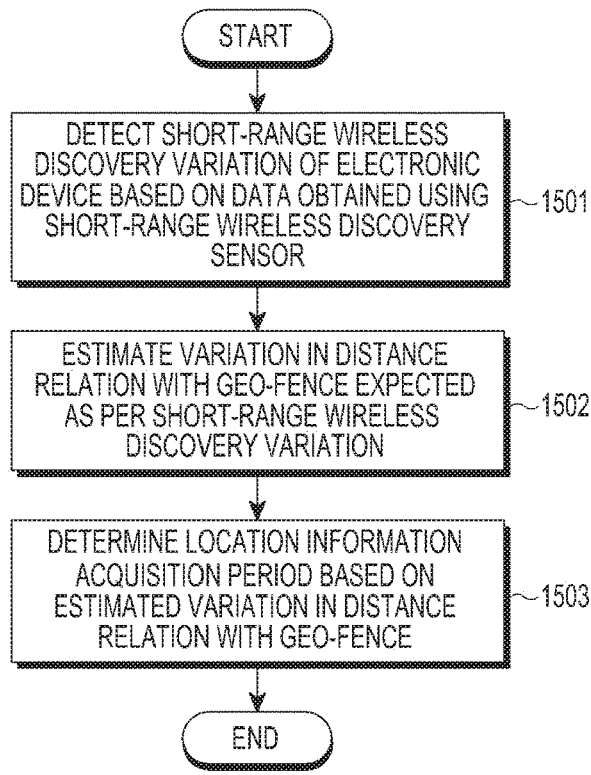
Figure 16:
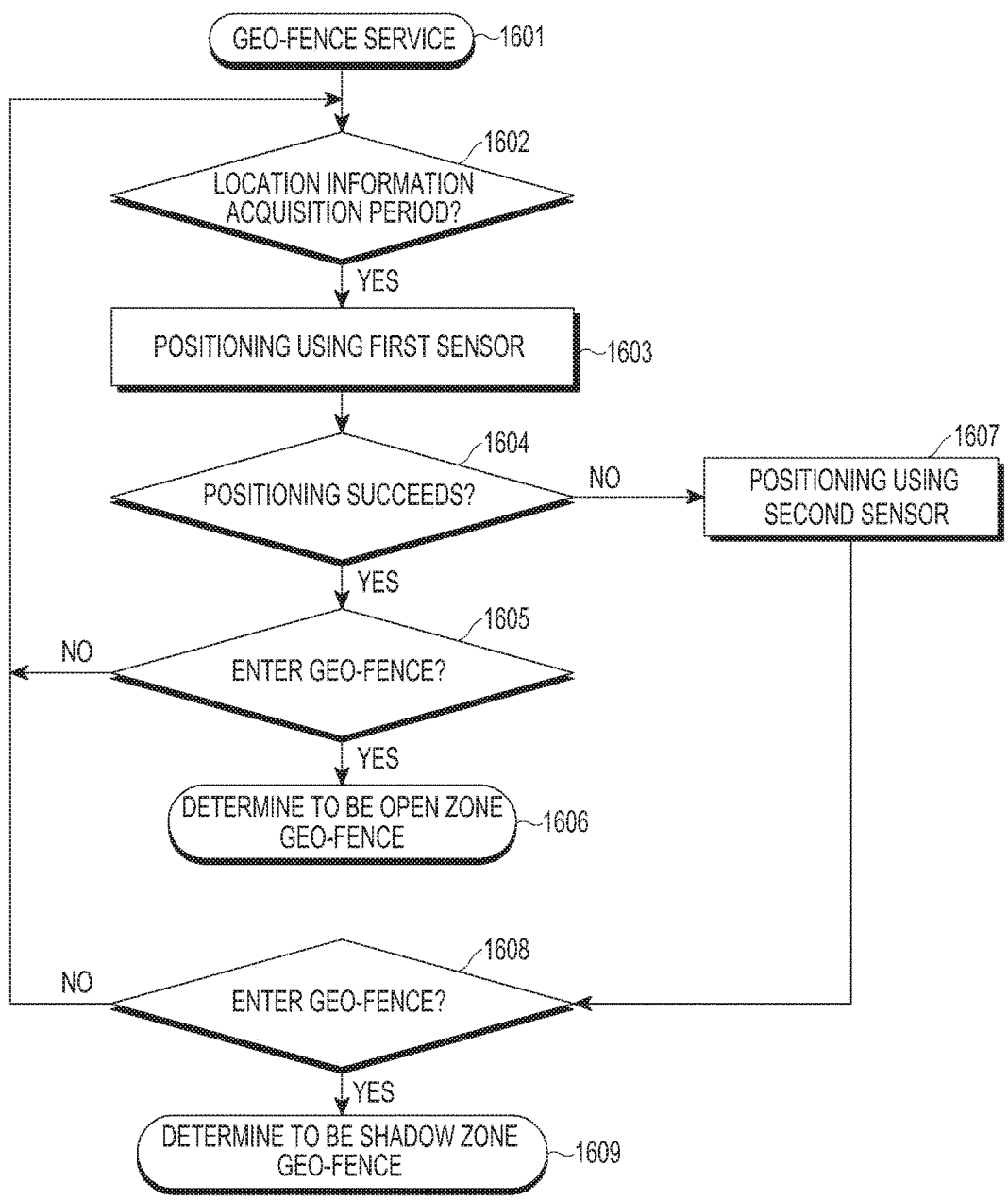
FIG. 16 is a flowchart illustrating a process for determining a geo-fence state by obtaining location information according to an embodiment of the present disclosure.

FIG. 13 is a flowchart illustrating a process for providing a geo-fence service by obtaining location information according to an embodiment of the present disclosure. FIGS. 14 and 15 are flowcharts illustrating a process for determining the period of obtaining location information according to an embodiment of the present disclosure. FIG. 16 is a flowchart illustrating a process for determining a geo-fence state by obtaining location information according to an embodiment of the present disclosure.

More specifically, FIGS. 13 to 16 illustrate respective processes of an SP of an electronic device to provide a geo-fence service by obtaining location information according to embodiments of the present disclosure.

Referring to FIG. 13, in operation 1301, the electronic device, upon request of a geo-fence service, may receive geo-fence-related data from a geo-fence server. The data may include, e.g., the location and measure of the geo-fence, and the data may further include e.g., cell ID and Wi-Fi list information of an area around the geo-fence. The activation of a geo-fence service may be performed by running a geo-fence service application installed on the AP. The AP may request the SP to perform the acquisition of location information and determination as to whether to enter or exit the geo-fence for the geo-fence service. Upon reception of the request, the SP may obtain location information for the geo-fence service and determine whether to enter or exit the geo-fence.

In operation 1302, the SP (e.g., the SP 1010) of the electronic device may attempt positioning using the first sensor (e.g., the first sensor 1040).

In operation 1303, the SP of the electronic device determines whether the positioning using the first sensor succeeds and, when it is determined that the positioning using the first sensor does not succeed in operation 1302, as determined in operation 1303, the SP may transmit, to the AP (e.g., the AP 1020), a notification (e.g., a location information acquisition request) corresponding to the failure to obtain location information. At this time, the AP may be in a deactivated state, a sleep mode or low-power mode state of the AP 620 to reduce power consumption.

In operation 1304, the AP of the electronic device may switch from the sleep mode or low-power mode to the wakeup mode according to the location information acquisition request from the SP, attempt positioning using the second sensor (e.g., the second sensor 1050) to obtain location information, and transmit the obtained location information to the SP. According to an embodiment of the present disclosure, the AP may obtain location information through a plurality of second sensors.

In operation 1305, when it is determined that the positioning using the first sensor succeeds in operation 1302, as determined in operation 1303, the SP of the electronic device may obtain location information using the first sensor, and when it is determined that the positioning using the first sensor fails to succeed in operation 1302, as determined in operation 1303, the SP may obtain location information by receiving the location information obtained using the second sensor as received from the AP.

In operation 1306, the SP of the electronic device may determine a distance relation with the geo-fence using the obtained location information. The SP of the electronic device may compare the obtained location information with geo-fence location information as per the geo-fence service request and determine a distance until the electronic device arrives at a border of the geo-fence with respect to the center of the geo-fence. Further, when the electronic device is located at the border of the geo-fence, a distance to the geo-fence border with respect to the location of the electronic device may be determined. Further, as the distance relation with the geo-fence, the SP may compare location information obtained at a prior time with location information obtained at the current time and determine the travel distance of the electronic device and a variation in distance made as the electronic device travels.

In operation 1307, the SP of the electronic device may determine whether the electronic device enters or exits the geo-fence according to the distance relation with the geo-fence. That is, when the obtained location information is determined to be located within the geo-fence border, the electronic device may be determined to be within the geo-fence, and when the obtained location information is determined to be outside the geo-fence border, the electronic device may be determined to be located outside the geo-fence. Further, regarding the determination as to whether the electronic device enters the geo-fence, when it is determined that the location information obtained at the prior time was located out of the geo-fence border but the location information obtained at the current time is within the geo-fence border, the electronic device may be determined to have entered the geo-fence. Further, regarding the determination as to whether the electronic device exits the geo-fence, when it is determined that the location information obtained at the prior time was located within the geo-fence border but the location information obtained at the current time is out of the geo-fence border, the electronic device may be determined to have exited the geo-fence.

In operation 1308, upon determining in operation 1307 that the electronic device enters or exits the geo-fence, the SP of the electronic device may transmit a result of the determination to the AP and enable the AP to thereafter provide a geo-fence service.

When the electronic device is determined in operation 1307 not to enter or exit the geo-fence, the SP of the electronic device may determine a location information acquisition period for next location information acquisition in operation 1309.

In operation 1310, the SP of the electronic device may determine whether it has reached the determined location information acquisition period. Upon determining that the location information acquisition period has not been reached, the SP remains at operation 1310, and upon determining that the location information acquisition period has been reached, the SP goes back to operation 1302 to obtain location information.

Specifically, operation 1309 of determining the location information acquisition period for obtaining location information may be performed by the method shown in FIGS. 14 and 15.

As an example, in the method for determining the location information acquisition period according to a variation in the motion of the electronic device, as shown in FIG. 14, the SP (e.g., the SP 1010) of the electronic device may detect a variation in the motion of the electronic device using at least one sensor (e.g., the sensor 1060) in operation 1401. The at least one sensor may include at least one of an acceleration sensor, a gyro sensor, a geo-magnetic sensor, and an altitude sensor. The SP may collect at least one piece of sensing data obtained from the at least one sensor and produce context data regarding the recognition of the operational state of the electronic device using, at least, the piece of sensing data. The sensing data obtained from the at least one sensor may be compared with a characteristic pattern of waveform according to each preset operational state to produce the context data having determined the operational state of the electronic device. That is, from the pattern, such as period, strength, or vibration of the sensing data obtained from the sensor, the context data representing the motion state (e.g., sitting, standing, walking, running, biking, or driving), moving speed, and moving direction of the user carrying the electronic device may be produced. The SP may detect a variation in the motion of the electronic device based on the produced context data.

In operation 1402, the SP of the electronic device may estimate a variation in distance relation with the geo-fence which is expected according to the variation in the motion of the electronic device. The SP may identify the distance between the electronic device and the geo-fence and may estimate a time when the electronic device may move as long as the distance from the geo-fence according to the motion state of the electronic device. In other words, the SP may estimate the time when the electronic device may arrive at the geo-fence area depending on the moving speed or direction of the electronic device according to the motion state of the electronic device. According to an embodiment of the present disclosure, a variation in the distance between the geo-fence and the electronic device may be measured.

In operation 1403, the SP of the electronic device may determine a period of obtaining location information based on the estimated variation in the distance relation with the geo-fence. For example, when the motion state is sitting or standing, the electronic device is determined to cause a variation in its moving distance while remaining stationary, and thus, the SP may determine to significantly increase the period of obtaining location information or may temporarily stop obtaining location information. Further, when the motion state is walking or running, the electronic device is determined to cause a little variation in its moving distance at a low moving speed, and thus, the SP may determine that the period of obtaining location information is shorter than when the motion state is standing but longer than when the motion state is biking or driving. Further, when the motion state is biking or driving, the electronic device is determined to cause a significant variation in its moving distance at a high moving speed, and thus, the SP may determine to significantly reduce the period of obtaining location information.

As another example, in the method for determining the location information acquisition period according to a short-range wireless discovery variation of the electronic device, as shown in FIG. 15, the first SP 1010 of the electronic device may detect a short-range wireless discovery variation of the electronic device using at least one sensor (e.g., sensor 1060) in operation 1501. The at least one sensor may be a short-range wireless discovery sensor, and the short-range wireless discovery sensor may be driven in a deactivated state, a sleep mode or low-power mode of the AP 1020, and the sensor may include at least one of a Wi-Fi module, a BT module, an RFID module, an IR sensor, and an ultrasonic sensor that may function as the short-range wireless discovery sensor. The SP may detect a discovery variation of a short-range wireless device located within a short distance of the electronic device based on a wireless discovery signal received from the short-range wireless discovery sensor.

In operation 1502, the SP of the electronic device may estimate a variation in distance relation with the geo-fence which is expected according to the short-range wireless discovery variation of the electronic device. The SP may identify the cell ID or Wi-Fi list information of the area around the geo-fence as included in the geo-fence service request and determine whether there is partial consistency or inconsistency with the cell ID or Wi-Fi list information on the area around the geo-fence based on a result of the short-range wireless discovery of the electronic device to estimate the degree at which the electronic device and the geo-fence approach.

In operation 1503, the SP of the electronic device may determine a period of obtaining location information based on the estimated variation in the distance relation with the geo-fence. For example, unless there is a discovered signal corresponding to the cell ID and Wi-Fi list for the area around the geo-fence from the short-range wireless discovery result of the electronic device, the SP may determine that there is a distance between the electronic device and the geo-fence and thus determines to significantly increase the period of obtaining location information or temporarily pause obtaining location information. Upon discovery of at least some signals corresponding to the cell ID or Wi-Fi list for a distance short from the geo-fence from the short-range wireless discovery result of the electronic device, the SP may determine that the electronic device is located close to the geo-fence and may determine the period of obtaining location information to be shorter than when no signal is discovered. Upon discovery of a signal corresponding to the cell ID or Wi-Fi list for an area within the geo-fence from the short-range wireless discovery result of the electronic device, the SP may determine that the electronic device is located very close to the geo-fence or that the electronic device has entered into the geo-fence and may determine to significantly reduce the period of obtaining location information.

According to an embodiment of the present disclosure, the electronic device may determine the state of a geo-fence by obtaining location information, and specifically, such may be performed by the method shown in FIG. 16.

Referring to FIG. 16, in operation 1601, the electronic device may perform a geo-fence service.

In operation 1602, the SP (e.g., the SP 1010) of the electronic device may determine whether a location information acquisition period has been reached for obtaining location information on the electronic device according to the geo-fence service, and when it is determined that the location information acquisition period is reached, the SP of the electronic device may attempt positioning using the first sensor (e.g., the first sensor 1040) in operation 1603.

In operation 1604, the SP of the electronic device determines whether the positioning using the first sensor succeeds, and when it is determined that the positioning using the first sensor fails to succeed, the SP may request the AP (e.g., the AP 1020) to obtain location information. At this time, the AP may be in a deactivated state, a sleep mode or low-power mode state of the AP 620 to reduce power consumption.

In operation 1605, when the positioning using the first sensor in operation 1603 succeeds, as determined in operation 1604, the SP of the electronic device may obtain location information using the first sensor and determine whether to enter the geo-fence using the obtained location information.

In operation 1606, the SP of the electronic device may obtain location information using the first sensor, and when entry into the geo-fence is determined by the obtained location information, the SP may determine whether the geo-fence is a geo-fence located in an open zone.

In operation 1607, the AP of the electronic device may switch from the sleep mode or low-power mode to the wakeup mode according to the location information acquisition request from the SP, attempt positioning using the second sensor (e.g., the second sensor 1050) to obtain location information, and transmit the obtained location information to the SP.

In operation 1608, when the positioning using the first sensor in operation 1603 does not succeed, as determined in operation 1604, the SP of the electronic device may receive the location information obtained using the second sensor from the AP and determine whether to enter the geo-fence using the obtained location information. Here, if it is determined not to enter the geo-fence, in operation 1608, the SP goes back to operation 1602.

On the other hand, if it is determined to enter the geo-fence in operation 1608, the SP of the electronic device may determine whether the geo-fence comprises a geo-fence located in a shadow zone, in operation 1609.

As is apparent from the foregoing description, according to embodiments of the present disclosure, an electronic device may control the acquisition of location information through a low-power processor, thus minimizing the wakeup of the high-power processor and enabling location information to be acquired without influence regardless of whether the electronic device is located in an open zone or shadow zone to thereby eliminate the need of a determination as to the escape of the shadow zone, leading to minimized power consumption to obtain location information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device including a first processor operable at a first power level and a second processor operable at a second power level, the method comprising:
    receiving first location information of the electronic device from an external electronic device through at least one first sensor functionally connected with the first processor;
    upon failure to identify second location information of the electronic device from the external electronic device through the at least one first sensor using the first processor, obtaining the second location information through at least one second sensor functionally connected with the second processor using the second processor;
    determining whether the electronic device enters a geo-fence based on at least one of the first location information or the second location information;
    when it is determined that the geo-fence is entered using the first location information, determining that the geo-fence comprises an open zone; and
    when it is determined that the geo-fence is entered using the second location information, determining that the geo-fence comprises a shadow zone.

2. The method of claim 1, further comprising receiving the first location information using the first processor while the second processor is in a first state.

3. The method of claim 2, wherein the first state includes one of a deactivated state, a low-power state, or a sleep state of the second processor.

4. The method of claim 2, wherein the obtaining of the second location information includes switching the second processor from the first state to a second state.

5. The method of claim 4, wherein the second state includes one of an activated state, a high-power state, or a wakeup state of the second processor.

6. The method of claim 1, further comprising, when the identification of the second location information using the first processor succeeds, maintaining a prior state of the second processor.

7. The method of claim 1, further comprising:
    enabling the first processor to obtain the location information to determine a distance relation with the geo-fence according to a request for a geo-fence service; and
    determining whether the electronic device enters or exits the geo-fence according to the distance relation with the geo-fence.

8. The method of claim 7, wherein the request for the geo-fence service includes geo-fence location information including a location and measure of the geo-fence.

9. The method of claim 7, wherein the determining of whether the electronic device enters the geo-fence comprises:
    when the distance relation with the geo-fence is determined using the first location information, determining that the geo-fence comprises an open zone; and
    when the distance relation with the geo-fence is determined using the second location information, determining that the geo-fence comprises a shadow zone.

10. The method of claim 1, further comprising:
    enabling the first processor to determine a period of obtaining the location information based on data obtained using at least one sensor; and
    obtaining the location information according to the determined period of obtaining the location information.

11. The method of claim 10, wherein the data includes at least one of at least one piece of sensing data obtained by the first processor, context data, or short-range wireless discovery data produced using the at least one piece of sensing data.

12. The method of claim 10, wherein the determining of the period of obtaining the location information comprises:
    detecting a variation in a motion of the electronic device based on the data obtained using the at least one sensor;
    estimating a variation in a location of the electronic device expected according to the variation in the motion; and
    determining the period of obtaining the location information based on the estimated variation in the location of the electronic device.

13. The method of claim 12, wherein the estimating of the variation in the location of the electronic device expected according to the variation in the motion comprises:
    detecting a motion state of the electronic device based on the data;
    comparing the data with a characteristic pattern of waveform according to a plurality of preset motion states of the electronic device to generate context data in accordance with the detected motion state; and estimating a current location of the electronic device by comparing short-range wireless discovery data with one of cell identification (ID) information or pre-stored Wi-Fi list information.

14. The method of claim 10, wherein the determining of the period of obtaining the location information comprises:
detecting a short-range wireless discovery variation of the electronic device based on the data obtained using the at least one sensor;
estimating a variation in a location of the electronic device expected according to the short-range wireless discovery variation; and
determining the period of obtaining the location information based on the estimated variation in the location of the electronic device.

15. An electronic device, comprising:
a memory configured to store location information of the electronic device received from an external electronic device;
a first processor operable at a first power level; and
a second processor operable at a second power level,
wherein the first processor is configured to:
receive first location information of the electronic device from the external electronic device through at least one first sensor functionally connected with the first processor,
upon failure to identify second location information of the electronic device from the external electronic device through the at least one first sensor, transmit a notification corresponding to the failure to the second processor,
determine whether the electronic device enters a geo-fence based on at least one of the first location information or the second location information,
when it is determined that the geo-fence is entered using the first location information, determine that the geo-fence comprises an open zone, and
when it is determined that the geo-fence is entered using the second location information, determine that the geo-fence comprises a shadow zone.

16. The electronic device of claim 15, wherein the second processor is configured to:
receive the notification, and
obtain the second location information through at least one second sensor functionally connected with the second processor based on the received notification.

17. The electronic device of claim 16,
wherein the at least one first sensor comprises a global positioning system (GPS) module, and
wherein the at least one second sensor includes at least one of a cell-based location information providing module, a Wi-Fi-based location information providing module, or a sensor-based location information providing module.

18. The electronic device of claim 15, wherein the first processor is further configured to:
obtain the location information to determine a distance relation with the geo-fence according to a request for a geo-fence service, and
determine whether the electronic device enters and exits the geo-fence according to the distance relation with the geo-fence.

19. The electronic device of claim 15, wherein the first processor is further configured to:
determine a period of obtaining the location information based on data obtained using at least one sensor, and
obtain the location information according to the determined period of obtaining the location information.

20. The electronic device of claim 19,
wherein the at least one first sensor includes at least one of an acceleration sensor, a gyro sensor, a geo-magnetic sensor, an altitude sensor, or a short-range wireless discovery sensor, and
wherein the short-range wireless discovery sensor includes at least one of a Wi-Fi module, a Bluetooth module, a radio frequency identification (RF ID) module, an infrared (IR) sensor, or an ultrasonic sensor.

21. A non-transitory computer-readable storage medium, which stores a program and commands configured to be executed by at least one processor to enable the at least one processor to perform at least one operation in an electronic device including a first processor operable at a first power level and a second processor operable at a second power level, the at least one operation comprising:
receiving first location information of the electronic device from an external electronic device through at least one first sensor functionally connected with the first processor;
upon failure to identify second location information of the electronic device from the external electronic device through the at least one first sensor using the first processor, obtaining the second location information through at least one second sensor functionally connected with the second processor using the second processor;
determining whether the electronic device enters a geo-fence based on at least one of the first location information or the second location information;
when it is determined that the geo-fence is entered using the first location information, determining that the geo-fence comprises an open zone; and
when it is determined that the geo-fence is entered using the second location information, determining that the geo-fence comprises a shadow zone.

* * * * *